United States Patent
Bodo et al.

(10) Patent No.: US 9,860,071 B2
(45) Date of Patent: Jan. 2, 2018

(54) POWER OVER ETHERNET INJECTOR

(71) Applicants: Martin J. Bodo, Los Alto Hills, CA (US); Robert A. Rosenbloom, Santa Cruz, CA (US); Lev Alexandrovich Melnikovsky, Moscow (RU)

(72) Inventors: Martin J. Bodo, Los Alto Hills, CA (US); Robert A. Rosenbloom, Santa Cruz, CA (US); Lev Alexandrovich Melnikovsky, Moscow (RU)

(73) Assignee: Computer Performance, Inc., Santa Clara, CA (US)

( * ) Notice: Subject to any disclaimer, the term of this patent is extended or adjusted under 35 U.S.C. 154(b) by 6 days.

(21) Appl. No.: 14/443,382

(22) PCT Filed: May 1, 2014

(86) PCT No.: PCT/US2014/036457
§ 371 (c)(1),
(2) Date: May 16, 2015

(87) PCT Pub. No.: WO2014/161009
PCT Pub. Date: Oct. 2, 2014

(65) Prior Publication Data
US 2015/0312048 A1    Oct. 29, 2015

Related U.S. Application Data

(60) Provisional application No. 61/771,080, filed on Mar. 1, 2013.

(51) Int. Cl.
*H04L 12/10* (2006.01)
*H02J 13/00* (2006.01)
(Continued)

(52) U.S. Cl.
CPC .......... *H04L 12/10* (2013.01); *H02J 13/0062* (2013.01); *H04L 43/0817* (2013.01);
(Continued)

(58) Field of Classification Search
None
See application file for complete search history.

(56) References Cited

U.S. PATENT DOCUMENTS 5,483,574 A    1/1996  Yuyama
6,218,930 B1   4/2001  Katzenberg et al.
(Continued)

*Primary Examiner* — Kim Huynh
*Assistant Examiner* — Kevin Stewart
(74) *Attorney, Agent, or Firm* — Donald E. Schreiber

(57) ABSTRACT

A midspan power over Ethernet ("PoE") injector (20) connects via LAN cables (514) to remote PDs (518). Each cable (514) has a remote end; and a midspan end (516). The cables (514) includes receiving and transmitting conductors, and insulated electrical conductors. The injector (20) includes pairs of sockets (24) a first socket (24) of each pair is a powered socket, and a second socket (24) is unpowered and carries only data. A data-signal bus (188) interconnects the unpowered and powered sockets. Power switches (156), equal in number to the socket pairs, connect respectively to one of the powered sockets (24). Without negotiating with a PD (518) connected by the cable (514) to the powered socket (24), a controller (34) causes switches (156) to close thereby transmitting electrical power via the powered socket (24) connected thereto and the cable (514) mated therewith to the PD (518). The controller (34) also concurrently monitors operational status:
  a. of each connected PD (518); and
  b. internal conditions within the injector (20).

23 Claims, 17 Drawing Sheets

(51) Int. Cl.
  *H04L 12/26* (2006.01)
  *H02J 7/00* (2006.01)
(52) U.S. Cl.
  CPC ..... *H02J 2007/006* (2013.01); *Y02B 90/2638* (2013.01); *Y04S 40/124* (2013.01); *Y04S 40/168* (2013.01)

(56) References Cited

U.S. PATENT DOCUMENTS

| | | | |
|---|---|---|---|
| 8,149,683 B2 | 4/2012 | Karam | |
| 2002/0105372 A1* | 8/2002 | Balakrishnan | G06F 1/26 327/427 |
| 2004/0123165 A1* | 6/2004 | Wierzbicki | G06F 1/26 713/300 |
| 2008/0073977 A1* | 3/2008 | Grolnic | G06F 1/30 307/66 |
| 2008/0077752 A1* | 3/2008 | Kinoshita | G06F 11/0727 711/154 |
| 2008/0114997 A1* | 5/2008 | Chin | H04L 12/10 713/321 |
| 2008/0141056 A1* | 6/2008 | AbuGhazaleh | H04L 12/66 713/340 |
| 2009/0083550 A1 | 3/2009 | Diab | |
| 2009/0243391 A1* | 10/2009 | Susong, III | H02J 1/06 307/66 |
| 2010/0005320 A1 | 1/2010 | Squillante | |
| 2010/0169689 A1* | 7/2010 | Liu | H04L 12/10 713/340 |
| 2011/0181533 A1* | 7/2011 | Pan | G02F 1/167 345/173 |
| 2011/0258465 A1* | 10/2011 | Diab | H04L 12/10 713/300 |
| 2012/0242168 A1 | 9/2012 | Tsai et al. | |
| 2013/0339760 A1 | 12/2013 | Zimmerman et al. | |
| 2014/0009178 A1* | 1/2014 | Bai | G01R 27/02 324/713 |
| 2014/0191568 A1* | 7/2014 | Partovi | H02J 7/025 307/9.1 |
| 2014/0334043 A1* | 11/2014 | Sun | H02H 9/06 361/18 |
| 2014/0359320 A1* | 12/2014 | Hua | H04L 12/10 713/300 |

* cited by examiner

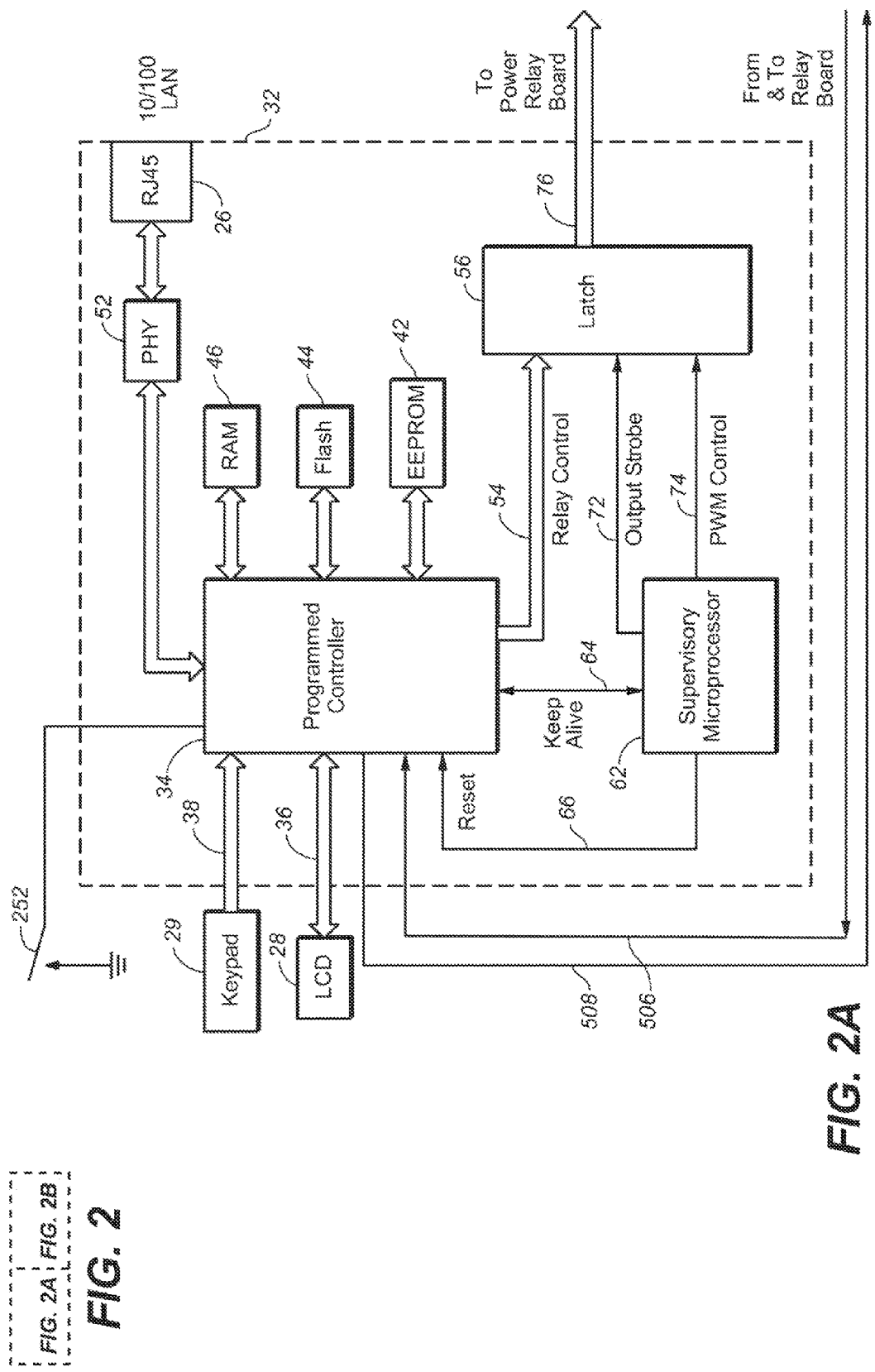

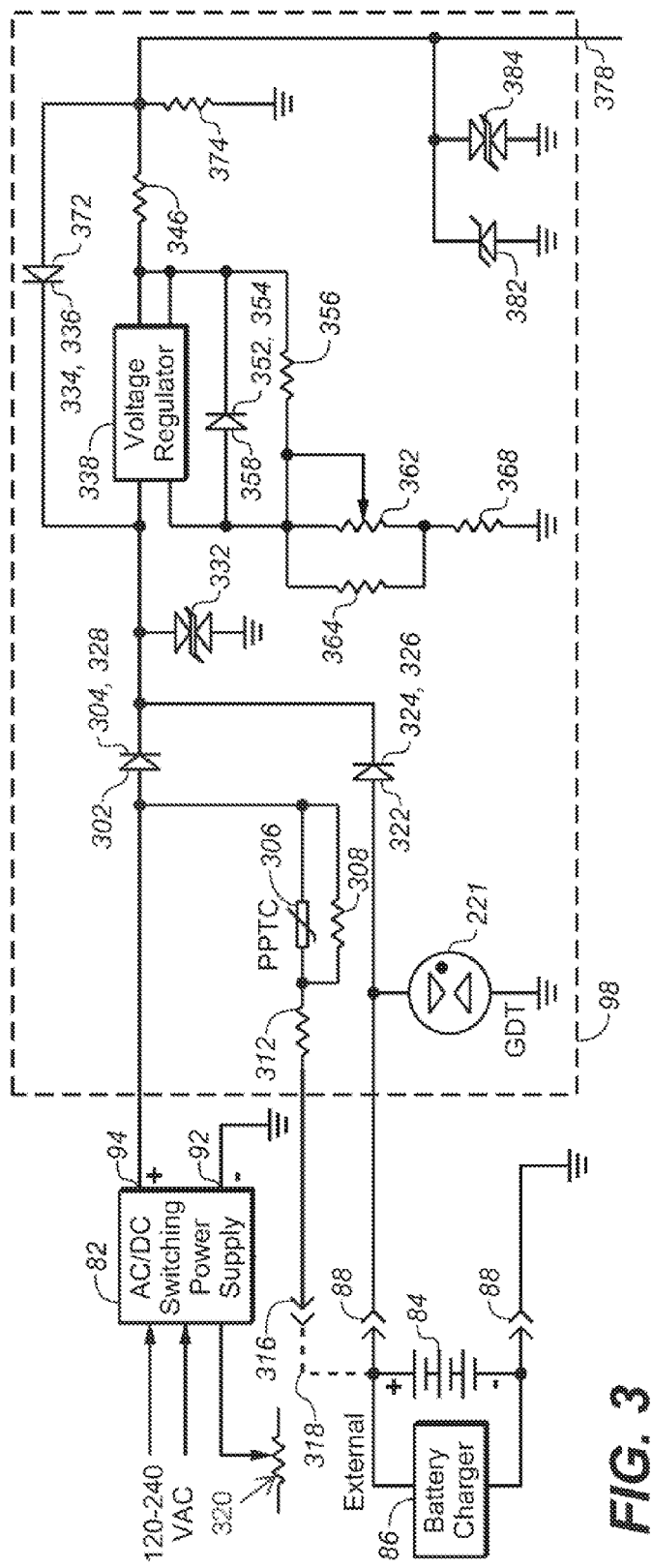
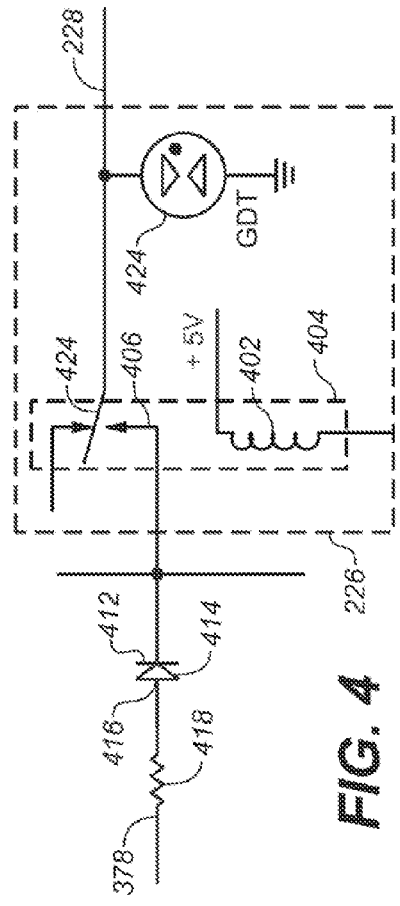
FIG. 3
FIG. 4

Setting Variables, Unique to Each IP

1. Time Between Pings
2. Packet Size
3. Ping Failures Before Reboot
4. # of Responses to Enable
5. Times to Attempt Reboot
6. Device Reboot Delay

DIGITAL LOGGERS, INC. Ethernet Power Controller

Controller: Smart 24V POE Injector V2
Tue Mar 25 12:06:00 2014

Port Control
Setup
Scripting
Date/Time
AutoPing
System Log
Logout
Support
Help

Individual Control

| # | Name | State | Action | |
|---|------|-------|--------|---|
| 1 | UBNT WiFi AP | ON | Switch OFF | Cycle |
| 2 | DSL Router | ON | Switch OFF | Cycle |
| 3 | 800MHz Link | ON | Switch OFF | Cycle |
| 4 | IBM Server | OFF | Switch ON | |
| 5 | Cooling Fans | OFF | Switch ON | |
| 6 | Alarm Bell | ON | Switch OFF | Cycle |
| 7 | PoE Switch 1 | OFF | Switch ON | |
| 8 | PoE Switch 2 | OFF | Switch ON | |

Master Control
All Ports OFF
All Ports ON
Cycle all Ports

Sequence delay: 10 sec.

Manual
FAQ
Product Information
Digital Loggers, Inc.

Version 1.6.A (Jan 22 2013 / 00:18:46)
8AA39795-41E644F4
S/N:POER2490108

FIG. 7

Network

| | |
|---|---|
| MAC Address | 00:0b:78 66 59 9c |
| HTTP port | 80 |
| IP address | 172.29.11.192 |
| Subnet mask | 255.255.255.0 |
| Gateway | 172.29.11.1 |
| Same subnet access only | ☐ |
| Syslog Server | 172.29.11.4 |

Submit

Administrator credentials

| | |
|---|---|
| Administrator login | admin |
| Old administrator password | |
| New administrator password | |
| Confirm new administrator password | |

Submit

POWER OVER ETHERNET INJECTOR

TECHNICAL FIELD

The present disclosure relates generally to power sourcing equipment ("PSE") for supplying electrical power together with data on Ethernet cabling to a remote powered device ("PD"), and, more particularly, to a PSE for reliably powering, connecting to, protecting, and resetting the PDs.

BACKGROUND ART

Power over Ethernet ("PoE") technology is a system for transmitting electrical power safely, together with data, via an Ethernet cable also known as a local area network ("LAN") cable. An Institute of Electrical and Electronics Engineers ("IEEE") standard IEEE 802.3 for PoE requires LAN category 5 cable or higher for high power transmission, but can operate with category 3 LAN cable for transmitting less power. In accordance with the IEEE standard, electrical power is transmitted in common mode over two (2) or more of the differential pairs of wires included in an Ethernet cable from the PSE i.e. either:
1. a power supply included in a PoE-enabled networking device such as an Ethernet switch; or
2. a midspan power supply located somewhere along a length of Ethernet cable.

The original IEEE 802.3af-2003 PoE standard provides up to 15.4 W of DC power (minimum 44 V DC and 350 mA) via an Ethernet cable. The IEEE standard assures delivering only 12.95 W of electrical power at the PD since a length of Ethernet cable dissipates some of the electrical power. The updated IEEE 802.3at-2009 PoE standard, also identified as PoE+ or PoE plus, transmits up to 25.5 W of power via an Ethernet cable. The PoE+ standard prohibits a PD, typically a WiFi access point (AP), a voice-over-IP (VoIP) phone or a security camera, from using all four pairs for power. Despite this prohibition, some PoE products, allegedly compatible with the 802.3at standard, offer up to 51 W of electrical power over a single Ethernet cable by transmitting electrical power via all four (4) of an Ethernet Category 5 cable's differential pairs.

Some PoE PSE devices send electrical power via otherwise unused conductors in the Ethernet Cable. Such PSE devices are generally termed "passive PoE". Other PoE PSE devices, commonly known as "active PoE" such as 8-wire 1000BT gigabit PoE, send both electrical power and data to a remote PD via the same Ethernet cable conductors, The 802.11af standard provides a method whereby the PSE and the PD negotiate the amount of power a PD requires. Using a method specified in the IEEE standard, initially a PoE source transmits a slowly increasing voltage (sawtooth or ramp) to the PD. As the voltage changes, the PD responds by drawing different load currents. The PoE source then "classifies" the PD based on the amount of current the PD draws at each voltage level. For example, a PoE source may assign one PD drawing 15.4 W maximum to one class, and another PD drawing 25.5 W to a different class. Based on the amount of power the PD draws, the PoE source then sets a maximum current level to be supplied to the PD. This process is called "negotiation" and "classification."

PSE devices that fully implement the IEEE 802.3af or 802.3at PoE standards encounter various technical problems. PSE devices operating in full compliance with the IEEE 802.11af standard work satisfactorily in a typical office environment, but prove unsatisfactory if the PD is outdoors, has multiple splices and/or connectors, or is a long distance from the PoE source. In remote and/or outdoor applications, the Ethernet cable's length often exceeds the initial IEEE standard's 100 meters or 328 feet. The electrical performance of category 5 or 3 Ethernet cable and connectors when used for PoE exhibit unexpected relatively high and unstable electrical resistance between an Ethernet cable's differential pairs of wires, and between those differential pairs and any outer shield. For such installations negotiation and classification in accordance with the IEEE 802.3af standard may fail, particularly during classification for various reasons.
1. Intermittent and resistive connections at the Ethernet cable's terminations frequently when unshielded twisted pair ("UTP") cables are used outdoors.
2. Short circuits and disconnects can occur, particularly in outdoor applications, most commonly when UTP cable deteriorate, or when the Ethernet cable's termination gets wet, or when the RJ45 connections originally intended for low-current indoor use are used outdoors.
3. Induced electrical noise on conductors carrying electrical power conductors can occur when power is back-fed in a complex network, when PDs include switching regulators, when electrostatic discharge ("ESD") is encountered (particularly in outdoor situations), and when electromagnetic interference ("EMI") is inductively, magnetically, and capacitively coupled into the Ethernet cable. For example, an indoor installation in which a long Ethernet cable runs past a series of overhead fluorescent light ballasts.

Yet another problem is that either or both the PD and the PSE may be damaged by power surges and electrostatic discharge ("ESD") received via an Ethernet cable or a PSE device's input power connection. PSE devices which fully implement the IEEE 802.3af standard are particularly vulnerable to ESD damage when a field effect transistor ("FET") is used for switching as recommended by the standard. A FET's low gate-drain breakdown voltage makes them particularly vulnerable to transient electrical surges. A growing use of longer Ethernet cables with outdoor PDs for which UTP cables were not designed creates a network of antennae which attracts large transient electrical surges.

Furthermore, a PD may "lockup" perhaps due to a semiconductor "latchup" in the PD's internal components. A conventional midspan PoE PSE cannot detect if such a latch-up occurs. In many situations, only a complete power-cycling with full shutoff of electrical power supplied by the PSE restore the PD's operation. Conventional PSE's are incapable of automatically detecting and correcting this type of lockup.

Finally, power glitches and brief interruptions of AC power to conventional PSE will cause attached devices to lockup or fail. The most common existing solution to this problem is attach an external uninterruptable power supply ("UPS") thereby providing the PSE with battery backup. A PSE that receives electrical power from an UPS cannot power up multiple PDs in pre-determined sequence with proper delays. Consequently, even though the UPS provides uninterrupted electrical power, if the battery eventually becomes fully discharged when electrical power is subsequently restored the PDs may not operate properly particularly if some PDs must be fully operational before other PDs can begin operation.

DISCLOSURE

The present disclosure is an improved midspan PoE injector.

An object of the present disclosure is to provide a midspan Poe injector for energizing the operation of PDs that does not require "negotiation" and/or "classification."

Another object of the present invention is to provide a midspan POE injector that may be enabled for actively monitoring the operational status of of PDs connected thereto.

Another object of the present invention is to provide a midspan POE injector that may autonomously restore to operation a PD that has ceased operation.

Another object of the present invention is to provide a midspan POE injector that monitors operational status internal conditions within the PoE injector.

Another object of the present invention is to provide a midspan POE injector capable of autonomously reporting about its status and the status of PDs connected thereto to a remote site.

Another object of the present invention is to provide a midspan POE injector that resists both damage to itself and damage to PDs connected thereto from electrical surges.

Another object of the present invention is to provide a midspan POE injector whose operation and that of PDs connected thereto may be powered either by AC power supplied to the PoE injector, or if energy from the AC power source should fail by an external battery.

Another object of the present invention is to provide a midspan POE injector whose operation an administrator can readily arrange for any arbitrary collection of PDs connected thereto.

Another object of the present invention is to provide a midspan POE injector whose operation an administrator can readily configure for semi-autonomous operation with any arbitrary collection of PDs connected thereto.

Briefly, disclosed is a midspan PoE injector for supplying electrical power to PDs that are:
 a. located remotely from the POE injector; and
 b. respectively connected to the POE injector by a first LAN cable.

The LAN cable has:
 a. a remote end that connects to the PD; and
 b. a midspan end that connects to the POE injector.

The LAN cable includes:
 a. receiving conductors via which the PD receives data;
 b. transmitting conductors via which the PD transmits data; and
 c. at least a pair of insulated electrical conductors via which the PD receives electrical power from the POE injector.

The disclosed POE injector includes pairs of sockets:
 a. a first of the sockets of each pair being a powered socket that receives the midspan end of the LAN cable; and
 b. a second of the sockets of each pair being an unpowered socket that receives a midspan end of a second LAN cable.

The second LAN cable carries only data received by and transmitted from the PD. In addition to the pairs of sockets, the POE injector includes a data-signal bus that interconnects the unpowered socket and the powered socket to couple data signals therebetween.

The PoE injector also includes power switches equal in number to the number of socket pairs. Each power switch is respectively connected to one of the powered sockets. When closed, the power switch supplies electrical power to the powered socket for coupling therefrom via the midspan end of the first LAN cable that is mated with powered socket to the pair of insulated electrical conductors included in the first LAN cable.

Without negotiating with a PD connected to one of the powered sockets by the first LAN cable, a controller, also included in the PoE injector, transmits a signal which causes one of the power switches to close thereby transmitting electrical power to the connected PD via the powered socket and the interconnecting first LAN cable. In addition to transmitting individual signals for closing individual power switches, the controller also concurrently monitors operational status both:
 a. of each PD connected to the powered socket by a first LAN cable; and
 b. internal conditions within the POE injector.

BRIEF DESCRIPTION OF DRAWINGS

FIG. 2 depicts the relationship between FIGS. 2A and 2B, the combined FIGS. forming a functional block diagram for an electronic circuit included the PoE injector of FIG. 1;

FIG. 2A is a functional block diagram of a control printed circuit board ("PCB") included in the PoE injector depicted in FIG. 1;

FIG. 3 is a schematic block diagram depicting a power source configuration circuit included in power control PCB illustrated in FIG. 2B;

FIG. 4 is a schematic block diagram depicting a single PD reset circuit, eight of which are included in power control PCB illustrated in FIG. 2B, for transmitting a reset signal to a PD connected to the PoE injector;

FIG. 7 presents a Web browser's image of an "Port Control" page, also called the home page, transmitted from an internal Web server included in the PoE injector of FIG. 1 to a host computer's Web browser that permits controlling the PoE injector's supplying of electrical power supplied to PDs connected thereto;

FIGS. 8A-8D, when concatenated in the order depicted in FIG. 8, present a Web browser's image of a "Setup" page transmitted from the internal Web server included in the PoE injector of FIG. 1 to a host computer's Web browser that an administrator uses for configuring the PoE injector's operation;

FIG. 10 presents a Web browser's image of a "Date/Time" page transmitted from the internal Web server included in the PoE injector of FIG. 1 to a host computer's Web browser that is used for assigning a date and time to the PoE injector;

FIG. 11 presents a Web browser's image of an "AutoPing" page transmitted from the internal Web server included in the PoE injector of FIG. 1 to a host computer's Web browser that is used for.

BEST MODE FOR CARRYING OUT THE DISCLOSURE

Figure 1:
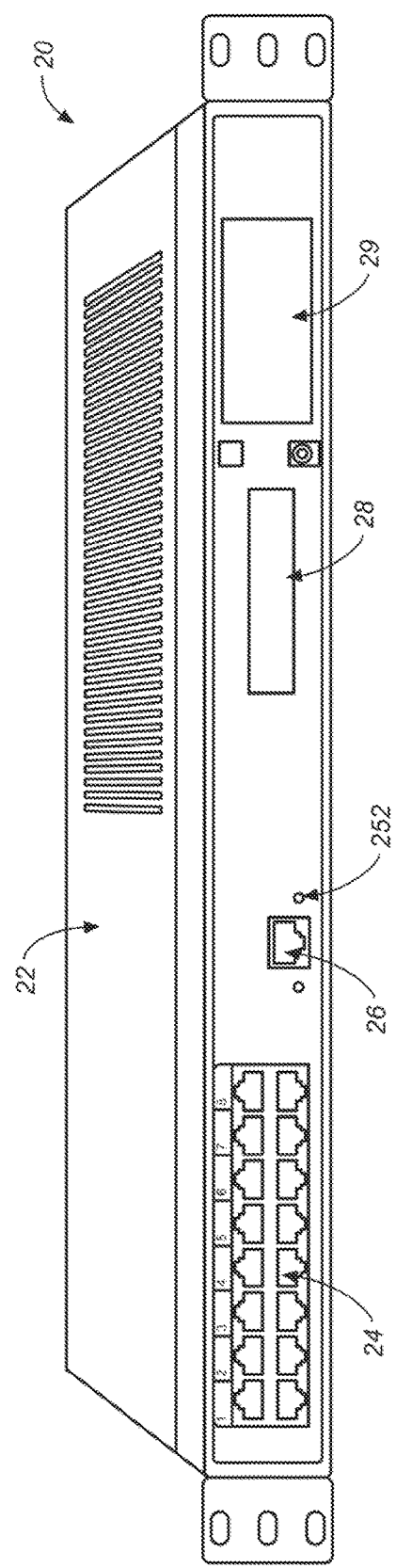
FIG. 1 is a perspective view of a PoE injector in accordance with the present disclosure.

FIG. 1 depicts a midspan PoE injector in accordance with the present disclosure referred to by the general reference character 20. As illustrated in FIG. 1, the PoE injector 20 includes a grounded and shielded sheet metal case 22 which houses a RJ45-2×8 double deck gang socket 24, one conventional 10/100 Ethernet Interface provided by a single RJ45 socket 26, a liquid crystal display ("LCD") 28, and a keypad 29. As described in greater detail below, the PoE injector 20 provides electrical power to one horizontal row of eight (8) RJ45 sockets included in the RJ45-2×8 double deck gang socket 24 for energizing operation of PDs connected to the RJ45 sockets by a LAN cable. Also enclosed within the case 22 is a control PCB 32 enclosed within a dashed line in the block diagram of FIG. 2A.

As depicted in FIG. 2A, the control PCB 32 includes a programmed controller 34 that connects to the LCD 28 via a LCD display bus 36 and to the keypad 29 by a keyboard bus 38. When the PoE injector 20 is operating, the programmed controller 34 exchanges data with an electrically erasable programmable read-only memory ("EEPROM") 42, a flash memory 44 and a RAM 46. As described in greater detail below, via the conventional 10/100 Ethernet port provided by the RJ45 socket 26 a computer program executed by the programmed controller 34 permits an administrator to:

1. supply data for configuring and controlling the operation of the PoE injector 20 in energizing operation of PDs connected to the PoE injector 20 via the RJ45-2×8 double deck gang socket 24 by LAN cables
2. enter programming scripts to configure power-up sequences, PD monitoring parameter, and PD rebootisng sequences; and
3. receive data from the PoE injector 20 pertinent to its configuration and operation, and to the operation of connected PDs.

The computer program executed by the programmed controller 34 also monitors the responsiveness of PDs whose operation is being energized by electrical power received from the RJ45-2×8 double deck gang socket 24.

The programmed controller 34 may be implemented using various different microcontrollers. For example, presently the preferred programmed controller 34 for a PoE injector 20 that includes only the RJ45 socket 26 for administrator communications with the PoE injector 20 as described in the preceding paragraph is a TM-331 Web Server Controller, marketed by Taifatech Inc., 8F-1, No. 289, Sec. 2, Kuan-Fu Rd., Hsin Chu, Taiwan R.O.C. Alternatively, if administrator communications with the PoE injector 20 as described in the preceding paragraph are to be effected using WiFi, then a AR9331 Highly-Integrated and Cost Effective IEEE 802.11n System on a Chip ("SOC"), marketed by Atheros Communications, Incorporated, 5480 Great America Parkway, Santa Clara, Calif., may be used advantageously for implementing the programmed controller 34.

As depicted in FIG. 2A, the conventional 10/100 Ethernet port provided by the RJ45 socket 26 connects to one side of a physical layer IC ("PHY") 52 that preferably is a Realtek Single Chip Single Port 10/100M Fast Ethernet Phyceiver RTL8201. The other side of the PHY 52 connects to the programmed controller 34. The computer program executed by the programmed controller 34 transmits signals via a relay control data bus 54 to a latch IC 56 included in the control PCB 32.

In addition to the programmed controller 34, the control PCB 32 also includes a supervisory microprocessor 62 that preferably is a Mictrochip PIC10F202 microcontroller, marketed by Microchip Technology, Inc. 2355 West Chandler Blvd., Chandler, Ariz. A bidirectional keep-alive signal bus 64 interconnects the supervisory microprocessor 62 and the programmed controller 34. If required, the supervisory microprocessor 62 can fully reset the programmed controller 34 via a reset signal line 66 without affecting the status of PDs connected to the PoE injector 20. The supervisory microprocessor 62 also supplies an output strobe signal 72 and a pulse width modulation ("PWM") signal 74 to the latch IC 56.

Figure 2B:
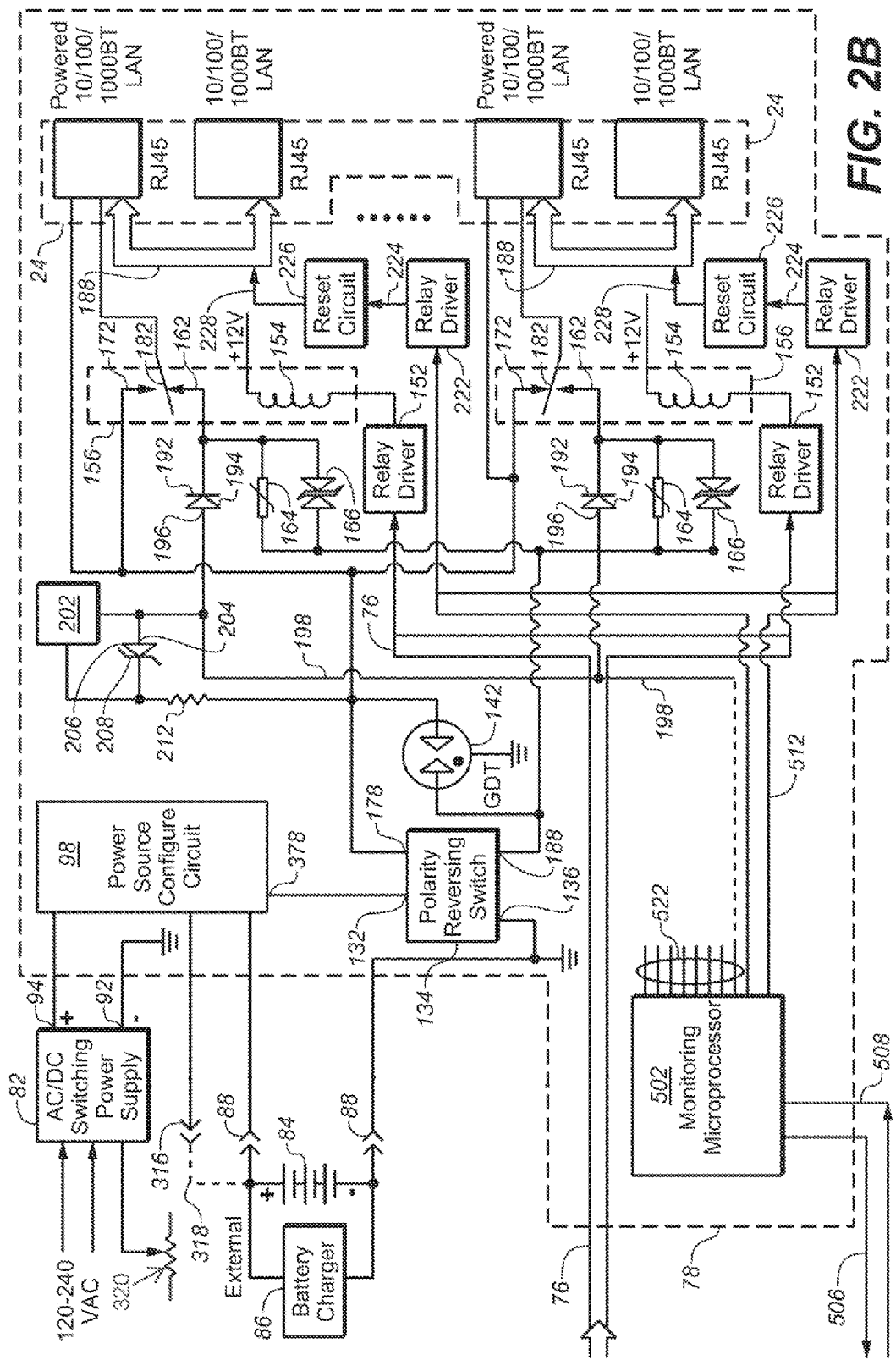
FIG. 2B is a schematic block diagram of a power control PCB included in the POE injector depicted in FIG. 1.

Responding to a combination of signals received respectively from the programmed controller 34 and from the supervisory microprocessor 62, the control PCB 32 transmits a set of eight (8) signals via a relay signal bus 76 from the control PCB 32 to a power control board 78 that is illustrated in FIG. 2B within a dashed line.

Referring now to FIG. 2B, the PoE injector 20 includes an AC-DC switching power supply 82 whose operation is preferably energized either by 120 or 240 volt alternating current ("AC"). An optional external backup battery 84 and also an optional external battery charger 86 may be connected to battery connection terminals 88 located on the outside of the the case 22, not illustrated in FIG. 1, for energizing operation of the PoE injector 20 during a power failure. Alternatively, if an AC power source is not available, operation of the PoE injector 20 and PDs connected thereto may be energized by any available DC power source such as a solar or wind-driven generator connected to the battery connection terminals 88 in parallel with the external backup battery 84.

For PoE injectors 20 that supply either 15 v or 24V electrical power to PDs, a negative output 92 of the AC-DC switching power supply 82 and a negative terminal of the optional external backup battery 84 connect directly to circuit ground of the power control board 78. A positive output 94 of the AC-DC switching power supply 82 and a positive terminal of the optional external backup battery 84 of such PoE injectors 20 connect directly to a power combining and regulating circuit circuit 98 included in the power control board 78 that is depicted in greater detail in FIG. 3. For PoE injectors 20 that supply 48v electrical power to PDs, the polarity of connections between the power control board 78 and the AC-DC switching power supply 82 and the external backup battery 84 are reversed.

Referring now to FIG. 3, within the power combining and regulating circuit circuit 98 the positive output 94 of the AC-DC switching power supply 82 connects to:
1. an anode 302 of a diode 304; and
2. first terminals of parallel connected:
   a. polymeric positive temperature coefficient ("PPTC") device 306, a/k/a a resettable fuse; and
   b. resistor 308.

The second terminals of the PPTC device 306 and the resistor 308 connect to a first terminal of an overall current limiting resistor 312. A second terminal of the resistor 312 connects to a battery trickle charging output 316 of the PoE injector 20. In this way the PPTC device 306 and the resistors 308 and 312 provide a dual-rate battery charging with a minimum of components.

Installing an optional battery recharging jumper 318, indicated by a dashed line in FIGS. 2B and 3, between the trickle charging output 316 and a positive terminal of the optional external backup battery 84 permits the PoE injector 20 to supply a battery recharging current to the external backup battery 84. A potentiometer 320 connected to the AC-DC switching power supply 82 permits adjusting the output voltage present at the juncture of the PPTC device 306 and the resistor 308 so a proper trickle charging current flows to any optional external backup battery 84.

If initially a battery recharging current drawn by the external backup battery 84 exceeds that permitted by the PPTC device 306, then the recharging current flows only through the series connected resistors 308 and 312. If the recharging current is below the threshold of the PPTC device 306, then current flows both through the series connected resistors 308 and 312 and the series connected PPTC device 306 and the resistor 312.

If the optional external backup battery 84 and perhaps the optional external battery charger 86 are connected to the PoE injector 20, within the power combining and regulating circuit circuit 98 their positive terminals connect respectively to:
1. a first pole of a ninety volt (90 V) 2-pole gas discharge tube ("GDT") 221; and
2. an anode 322 of a diode 324.

A second pole of the GDT 221, a Bourns 2027 Series 2-pole gas discharge tube or a corresponding component from Littlefuse, connects to circuit ground. A cathode 326 of the diode 324 connects to a cathode 328 of the diode 304.

Configured in this way, the diodes 304 and 324 ensure that the voltage present at the juncture of their cathodes 326, 328 will be the higher of the voltages supplied to the power combining and regulating circuit circuit 98 by the AC-DC switching power supply 82 and the external backup battery 84. Thus, if the 120 or 240 volt AC supplied to the AC-DC switching power supply 82 or the AC-DC switching power supply 82 itself should fail, the PoE injector 20 will receive electrical power from an optional external backup battery 84 thereby ensuring uninterrupted operation of the PoE injector 20.

The juncture of the cathodes 326, 328 connects to:
1. a first terminal of a transient voltage suppression diode 332;
2. a cathode 334 of a first protection diode 336; and
3. an input terminal of a voltage regulator circuit 338.

A second terminal of the transient voltage suppression diode 332 connects to circuit ground. The transient voltage suppression diode 332 is preferably chosen from a 5KP Series of transient voltage suppression diodes. Because the disclosed PoE injector 20 may be configured for supplying a specified voltage, e.g. 15V, 24V, or 48V, to PDs via LAN cables, the particular type of 5KP Series of transient voltage suppression diodes included in the power control board 78 depends upon the voltage to be supplied by the PoE injector 20 to PDs.

So the PoE injector 20 can provide the amount of electrical current required for energizing up to eight (8) PDs, the voltage regulator circuit 338 preferably includes a pair of LM338 Adjustable Regulators, marketed by Texas Instruments, that are connected in parallel. Within the voltage regulator circuit 338, both an output terminal and a housing, which is also an output terminal, of each LM338 Adjustable Regulator respectively connect to a first terminal of a 0.1 ohm resistor not depicted in any of the FIGS. A junction between second terminals of the 0.1 ohm resistors connects to:
1. a first terminal of an output resistor 346; and
2. a parallel connected:
   a. cathode 352 of a second protection diode 354; and
   b. first terminal of a feedback resistor 356.

A juncture between an anode 358 of the second protection diode 354 and a second terminal of the resistor 356 connect to:
1. an adjustment terminal of each LM338 Adjustable Regulator included in the voltage regulator circuit 338; and
2. a parallel connected:
   a. first terminal and wiper of an adjustable resistor 362; and
   b. first terminal of a resistor 364.

A juncture between second terminals of the adjustable resistor 362 and the resistor 364 connects through a resistor 368 to circuit ground. Adjusting the resistance of the adjustable resistor 362 permits setting the output voltage produced by the voltage regulator circuit 338 to a specific value.

A second terminal of the output resistor 346 connects to a juncture between:
1. an anode 372 of the first protection diode 336; and
2. a first terminal of a resistor 374 a second terminal of which connects to circuit ground.

The juncture among the second terminal of the output resistor 346, the anode 372 of the first protection diode 336 and the first terminal of the resistor 374 is an output 378 of power combining and regulating circuit circuit 98.

As depicted in FIG. 2B, the output 378 of the power combining and regulating circuit circuit 98 connects to a first input terminal 132 of a double-pole double-throw polarity reversing switch 134. A second input terminal 136 of the polarity reversing switch 134 connects to circuit ground.

The power control board 78 includes several components for protecting the PoE injector 20 from damage by EMI, power surges, static, and nearby lightning cause transients to which LAN cables such as category 5 or 6 cable may be exposed. PoE injectors that use FET switches for injecting electrical power into an Ethernet cable exhibit poor reliability in transient environments caused by power surges, static, and nearby lightning. Included among the transient protection components of the PoE injector 20 is the transient voltage suppression diode 332 included in the power combining and regulating circuit circuit 98. Furthermore, the transient protection components included in the PoE injector 20 protect it from miswired LAN cables, e.g. two PoE injectors 20 connected to each other. Analogously, the diode 324 ensures that a miswired external backup battery 84 cannot damage the PoE injector 20.

In addition to the transient protection GDT 221 and transient voltage suppression diode 332 included in the power combining and regulating circuit circuit 98 depicted in FIG. 3, the power combining and regulating circuit circuit 98 also includes both a Schottky diode 382 and a transient voltage suppression diode 384 that is similar to the transient voltage suppression diode 332. The diodes 382, 384 connect in parallel between the output 378 of the power combining and regulating circuit circuit 98 and circuit ground thereby placing them across the input terminals of the polarity reversing switch 134. The diode 382 is preferably a fast response 10-20 A Schottky diode, and the transient voltage suppression diode 384 is preferably chosen from a 5KP Series of transient voltage suppression diodes. As depicted in FIG. 3, the power control board 78 also includes a ninety volt (90 V) 3-pole gas discharge tube ("GDT") 142, preferably a Bourns 2036 series miniature 3-pole gas discharge tube or a corresponding component from Littlefuse. Output terminals of the polarity reversing switch 134 connect across opposite poles of the GDT 142, and a third pole of the GDT 142 connects to circuit ground.

Via the relay signal bus 76, inputs of eight (8) coil drivers 152 included in the power control board 78 receive signals from the latch IC 56 included in the control PCB 32. An output of each relay driver 152 connects to a first terminal of a coil 154 of a preferred doubel-pole, double-throw relay 156. A second terminal of the coil 154 receives +12V electrical power. A normally open contact 162 of the relay 156 connects through a parallel connected PPTC device 164 and transient voltage suppression diode 166, a/k/a a transorb or tranzorb, to a first output terminal 168 of the polarity reversing switch 134. A normally closed contact 172 of the relay 156 connects directly to a second output terminal 178 of the polarity reversing switch 134. In conformance with the IEEE PoE standard, an armature 182 of the relay 156 connects to pins 4-5 of one socket included in the RJ45-2×8 double deck gang socket 24. Also in conformance with conformance with the IEEE PoE standard, pins 7-8 of one horizontal row of sockets included in the RJ45-2×8 double deck gang socket 24 connect directly to the second output terminal 178 of the polarity reversing switch 134. Eight (8) data-signal buses 188 respectively connect together those contacts of vertically adjacent pairs of sockets included in the RJ45-2×8 double deck gang socket 24 that the IEEE PoE standard specifies for carrying data signals.

Configured in this way, the relay 156 operates as a power switch which when the coil 154 of the relay 156 is not energized and the normally open contact 162 and armature 182 are open interconnects via the normally closed contact 172 and armature 182 pins 4-5 and 7-8 of one socket included in the RJ45-2×8 double deck gang socket 24. Energizing the coil 154 of the relay 156 decouples pins 4-5 of that socket from pins 7-8 thereof, and the normally open contact 162 and the armature 182 close whereby the relay 156 switches to coupling electrical power to pins 4-5 of that socket from the normally open contact 162. During operation of the PoE injector 20, the PWM signal 74 that the supervisory microprocessor 62 supplies to the latch IC 56 pulse width modulates the electrical signal supplied to each coil 154 of all relays 156 thereby reducing electrical power dissipated by the relays 156.

So the PoE injector 20 can detect if a PD draws an excessive amount of current which causes the PPTC device 164 to enter its high resistance state, cathodes 192 of diodes 194 connect respectively to the normally open contact 162 of each relay 156. An anode 196 of each of the diodes 194 connects to a diode OR line 198. The diode OR line 198 connects to:
1. one terminal of a piezoelectric beeper 202; and
2. an anode 204 of a Zener diode 206.

A cathode 208 of the diode 206 connects to:
1. a first terminal of a resistor 212; and
2. a second terminal of the piezoelectric beeper 202.

A second terminal of the resistor 212 connects to the second output terminal 178 of the polarity reversing switch 134. Configured in this way the piezoelectric beeper 202 included in the the PoE injector 20 emits an audible alarm if any connected PD draws an excessive amount of current.

Manufacturers of some PDs equip their products with a remote reset feature that is not presently included in the IEEE standard. Transmitting a sufficiently high positive polarity DC voltage to such a PD via a LAN cable's Rx signal lines causes the PD to execute a reset procedure. To accommodate this feature of such PDs, the power control board 78 of the PoE injector 20 includes eight (8) relay drivers 222 that respectively receive a signal for resetting a particular PD specified by data sent from the programmed controller 34 of the control PCB 32. Upon receiving such a signal, the relay driver 222 transmits a signal via a relay signal line 224 to a reset circuit 226 included in the power control board 78, that is depicted in greater detail in FIG. 4.

As depicted in FIG. 4, the signal received by the reset circuit 226 from the relay driver 222 via the relay signal line 224 is applied to a first terminal of a coil 402 of a relay 404. A second terminal of the coil 402 receives +5V electrical power. Normally open contacts 406 of relays 404 respectively included in each of the reset circuits 226 connect in parallel to a cathode 412 of a diode 414. An anode 416 of the diode 414 connects to a first terminal of a resistor 418 the second terminal of which connects to the output 378 of the power combining and regulating circuit circuit 98. An armature 422 of the relay 404 connects to:
1. a first pole of a ninety volt (90 V) 2-pole gas discharge tube ("GDT") 424; and
2. a PD reset signal line 228.

A second pole of the GDT 424, a Bourns 2027 Series 2-pole gas discharge tube, connects to circuit ground.

Referring back to FIG. 2B, the PD reset signal line 228 connects the reset circuit 226 to either of the Rx signal lines included in the corresponding data-signal bus 188, i.e. to either pin 1 or pin 2 of the corresponding RJ45 socket included in the RJ45-2×8 double deck gang socket 24 that connects via a LAN cable to a PD. Configured in this way, the PoE injector 20 can transmit the positive polarity DC voltage to a resettable PD that is required to initiate its resetting procedure.

In addition to the programmed controller 34 and the supervisory microprocessor 62 present on the control PCB 32, the PoE injector 20 includes a monitoring microprocessor 502 located on the power control board 78. Preferably, the monitoring microprocessor 502 is a ATmega328-AU Microcontroller marketed by Atmel Corporation 2326 Orchard Parkway, San Jose, Calif. The monitoring microprocessor 502 and the programmed controller 34 exchange data via a bidirectional serial data link formed by serial communication lines 506 and 508. Responsive to data received from the programmed controller 34, the monitoring microprocessor 502 transmits a signal via a reset signal bus 512 to a specified relay driver 222 which activates sending a reset signal to a specified PD as described previously.

Figure 5:
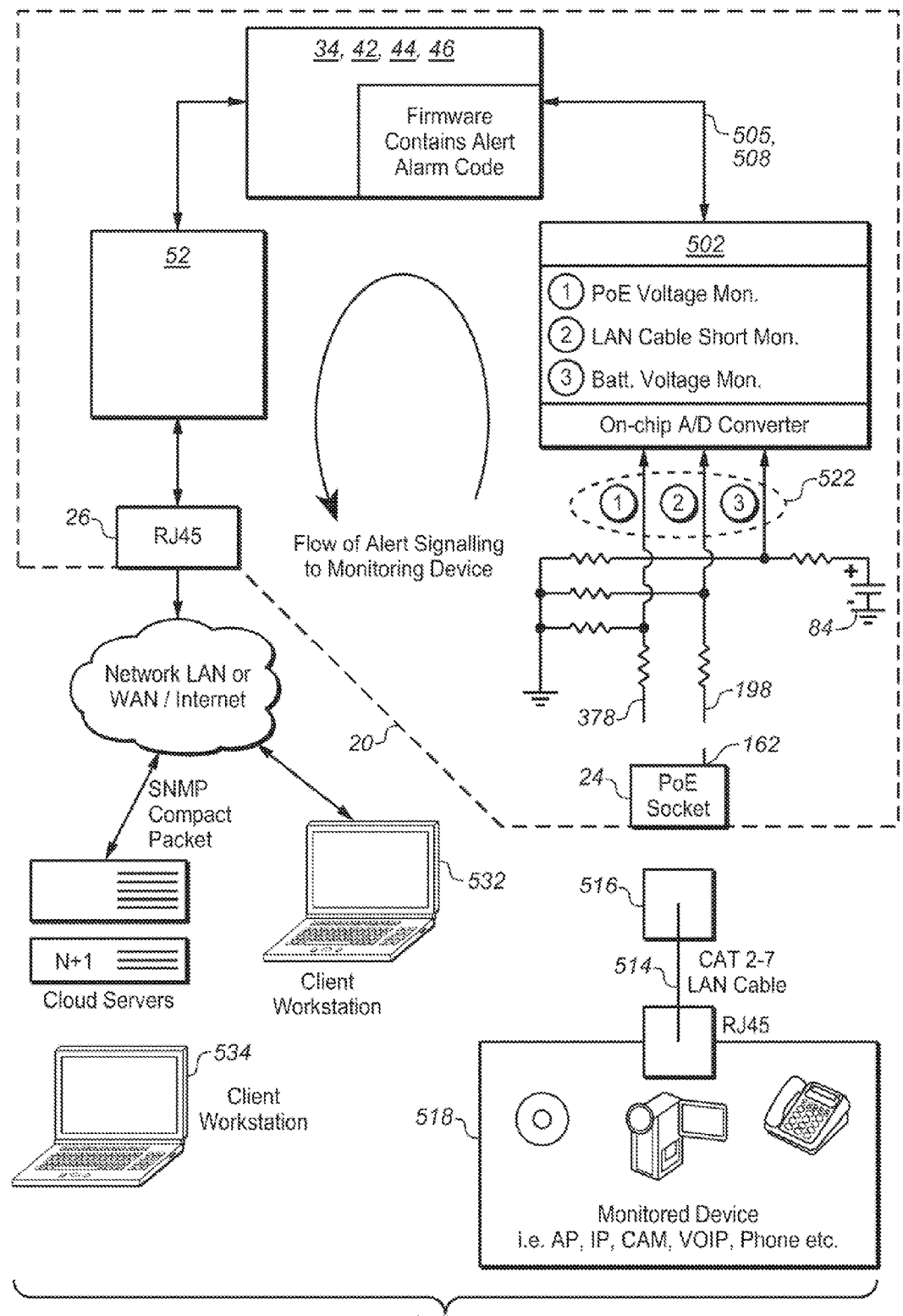
FIG. 5 block diagram illustrating a system that includes the PoE injector depicted in FIGS. 1-4 concurrently monitoring both operational status of a PD connected to the PoE injector, and operational conditions internally within the PoE injector.

FIG. 5 illustrates a system in which a LAN cable 514 having a midspan end 516 that mates with an RJ45 socket included in the RJ45-2×8 double deck gang socket 24 connects to a PD 518. To provide the control PCB 32 with data regarding the status of the power control board 78 and of PDs 518 connected thereto, eight (8) analog-to-digital converter ("ADC") input pins 522 included in the preferred monitoring microprocessor 502 permit monitoring voltages at various points in the power control board 78. Voltages present at selected locations within the power control board 78, appropriately scaled resistively as illustrated in FIG. 5, are applied to individual ADC input pins 522. For example, a scaled value of the voltage present on the diode OR line 198, indicated by a dashed line in FIG. 2B, is applied to one of the ADC input pins 522. Scaled voltages applied to other ADC input pins 522 of the monitoring microprocessor 502 are:

1. the voltage present at the output 378 of the power combining and regulating circuit circuit 98;
2. 3.0 volt power supplied to various IC included in the 20; and
3. the positive battery voltage supplied to the power control board 78.

Firmware executed by the programmed controller 34 receives the results of this monitoring via the serial communication line 506. As depicted in FIG. 5, the programmed controller 34 can transmit monitored results to other workstations 532, 534 via the PHY 52 and the RJ45 socket 26 either to:

1. a SYSLOG server as a report specified in a script as described in greater detail below; and/or
2. a Network Management Station ("NMS") as a Simple Network Management Protocol ("SNMP") message.

The PoE injector 20 provides under voltage lockout ("UVLO") and over voltage protection ("OVP") both of which are essential for proper operation of the PoE injector 20 when powered by the external backup battery 84. Both of these functions are implemented in firmware executed by the programmed controller 34. In performing UVLO and OVP, the programmed controller 34, uses the following data received from the monitoring microprocessor 502.

1. Voltage present on the diode OR line 198
2. AC input voltage received by the AC-DC switching power supply 82
3. Battery voltage supplied to the battery connection terminals 88
4. The voltage transmitted from the power combining and regulating circuit circuit 98 to the first input terminal 132 via the output 378

UVLO prevents damaging the external backup battery 84 by an excessive discharge. A typical 12V sealed-lead acid battery is discharged more than 90% when its output voltage decreases to 11V. Upon didcharging the external backup battery 84 to this extent, continuing full operation of the PoE injector 20 would rapidly fully discharge the battery. If a battery remains in a fully discharged state for an extended interval its plates sulfate, expand and ultimately destroy the battery. Furthermore, when a battery becomes 99% dicharged it enters a high-impedance state in which battery voltage may oscillate up and down. To prevent both damaging the external backup battery 84 and perhaps PDs 518 connected to the PoE injector 20, firmware executed by the programmed controller 34:

1. immediately stops supplying electrical power to the RJ45-2×8 double deck gang socket 24 upon sensing from the battery's voltage that the external backup battery 84 is 90% discharged; and
2. does not resume supplying power to the RJ45-2×8 double deck gang socket 24 until the battery's voltage increases approximately five to ten percent (5-10%) above the voltage when 90% discharged.

As described in greater detail below, if an administrator for the PoE injector 20 has prepared script(s) that program operation of the PoE injector 20, then those script(s) are executed as the programmed controller 34 restores electrical power to the RJ45-2×8 double deck gang socket 24 after a UVLO event occurs.

OVP occurs if firmware executed by the programmed controller 34 detects either:

1. an excessively high voltage at the output 378 of the power combining and regulating circuit circuit 98; or
2. an excessively high voltage at the battery connection terminals 88, i.e. 20% greater than the maximul allowed battery charging voltage.

If firmware executed by the programmed controller 34 detects either of the preceding conditions, then the programmed controller 34 immediately stops supplying electrical power to the RJ45-2×8 double deck gang socket 24. Every thirty seconds after turning off power to the RJ45-2×8 double deck gang socket 24, the programmed controller 34 again checks both voltages and will not resume supplying power to the RJ45-2×8 double deck gang socket 24 until both voltages are below their respective OVP thresholds.

In practice, firmware executed by the programmed controller 34 ignores excessive AC voltage supplied to the AC-DC switching power supply 82 since the AC-DC switching power supply 82 has been carefully configured to gracefully handle over voltage conditions. Included among various features of the input to the AC-DC switching power supply 82, none of which appear in any of the FIGS., which provide the AC-DC switching power supply 82 with an ability to handle over voltage are:

1. an input filter (pi network) having:
    a. grounded capacitors to reduce short AC transients; and
    b. series inductors to attenuate input current changes;
2. a common mode choke;
3. a negative temperature coefficient ("NTC") inrush current limiter; and
4. a Metal Oxide Varistor ("MOV") connected across the AC input to the AC-DC switching power supply 82 after the preceding components.

While the preceding power protection aspects of the AC-DC switching power supply 82 are directed toward anomolous conditions in AC input power, they also provide protection for electrical power coming from the power control board 78. If an electrical surge traversing one or more of the LAN cables 514 reaches the power control board 78, the surge will seek the easiest path to ground which, because no isolation is perfect, is through the AC-DC switching power supply 82 where these protection components are located and can contribute to absorbing and dissipating the surge.

Description of Software

In addition to supplying the output strobe signal 72 and the PWM signal 74 to the latch IC 56, a computer program executed by the supervisory microprocessor 62 monitors operation of the programmed controller 34. If the supervisory microprocessor 62 detects that the programmed controller 34 has stopped operating, the supervisory microprocessor 62 autonomously freezes the state of relay control signals present in the latch IC 56 and reboots the programmed controller 34.

The computer program executed by the programmed controller 34 provides a Web server for communicating with a host computer via a LAN connected to the RJ45 socket 26. The internal Web server of the PoE injector 20:

1. handles secure authentication that restricts access to the PoE injector 20 to authorized individuals;
2. permits checking operating status of the PoE injector 20;

3. can enable the PoE injector 20 for performing an AutoPing operation to track operation of any or all of the eight (8) PDs 518 that receive electrical power from the RJ45-2×8 double deck gang socket 24 and, when required, reboot such PD's operation;
4. monitors condition of the and all eight (8) PPTC devices 164;
5. via a scripting facility, provides access to basic commands for controlling electrical power supplied to any or all of the eight (8) RJ45 sockets included in the RJ45-2×8 double deck gang socket 24 thereby enabling the PoE injector 20 to individually control operation of each of the eight (8) PDs 518 that receive electrical power from the RJ45-2×8 double deck gang socket 24; and
6. permits establishing a script that specifies transmission of a Wake on Lan ("WOL") message via the RJ45 socket 26 from the PoE injector 20 to a host computer.

A computer program listing appendix that accompanies this patent application includes the text of the computer program executed by the programmed controller 34.

At a host computer, a Web browser accesses the internal Web server of the PoE injector 20 by entering an Internet Protocol ("IP") address in the Web browser's uniform resource locators ("URLs"), also called universal resource locators, field. The default IP address for the Web server of the PoE injector 20 is http://192.168.0.100. Accessing the Web server produces a log-in message on the host computer's Web browser. The default "user name" for the Web server of the PoE injector 20 is "username," and the default password is "1234." The Web server's operation permits changing both the "user name" and password after a successful log-in using the default "user name" and password.

Home Page

FIG. 7 presents an image of a home page that appears on the host computer's Web browser immediately after a successfully logging into the Web server provided by the PoE injector 20. As listed along the left hand side of the "Port Control" home page, the home page includes links to twelve (12) other pages, i.e. pages in addition to the "Port Control" home page. The upper seven (7) links are fixed links to Web pages provided by the internal Web server that the PoE injector 20 transmits to the host computer. The lower six (6) links are to Web pages external to the PoE injector 20. Someone logged onto the PoE injector 20 may select any of the links. The seven (7) Web pages provided by the PoE injector 20 are:
1. "Port Control", which appears on the host computer's browser as the internal Web server's home page immediately after a successful log-in;
2. "Setup;"
3. "Scripting;"
4. "Date/Time;"
5. "AutoPing;"
6. "System Log;" and
7. "Logout."

The lowest four links of the six (6) links appearing below the seven (7) fixed links permit an administrator to specify a link to any Internet Web page by specifying that page's URL that is then stored in the PoE injector 20.

"Port Control" Page

Selecting the phrase "Port Control" on any Web page transmitted from the internal Web server of the PoE injector 20 to the host computer's browser causes the home page, also called the "Port Control" page, reproduced in FIG. 7 to appear at the host computer's browser. Appearing in FIG. 7 to the right of the list of links is a table summarizing the status of the eight (8) pairs of interconnected RJ45 sockets included in the RJ45-2×8 double deck gang socket 24. This home or "Port Control" page permits manually switching on or off electricity supplied to individual pairs of interconnected RJ45 sockets included in the RJ45-2×8 double deck gang socket 24. Using the "Port Control" page, if enabled while setting up the PoE injector 20, electricity supplied to individual pairs of interconnected RJ45 sockets included in the RJ45-2×8 double deck gang socket 24 may be cycled, i.e. the PoE injector 20 switches power off, waits for the time interval specified on the setup page, and then switches power back on. A "Master Control" section at the bottom of the "Port Control" page permits turning all outlets off, all outlets on, and cycling electrical power to all outlets as described above. In setting up the PoE injector 20, the administrator specifies an individual log-in "user name" that is permitted to control operation of a specific pair of interconnected RJ45 sockets listed on the "Port Control" page.

The image that appears on a browser when the administrator logs onto the PoE injector 20 is that which appears in FIG. 7, i.e. the administrator has access to all eight (8) pairs of interconnected RJ45 sockets included in the RJ45-2×8 double deck gang socket 24. When others who are not the administrator log onto the PoE injector 20 using their "user name," the image that appears on the browser is limited to those pairs of interconnected RJ45 sockets included in the RJ45-2×8 double deck gang socket 24 that, as described below, the administrator, using the "Setup" page, has assigned to the logged on "user name." If the administrator has not granted a particular "user name" access to a particular pair of interconnected RJ45 sockets, that pair doesn't even appear on the browser. Consequently, if a user other than the administrator selects any of the operations appearing in the "Master Control" section of the "Port Control" page, the operation is performed on only those pairs of pairs of interconnected RJ45 sockets appearing on the browser. This particular aspect of the PoE injector 20 is useful in an environment in which a single PoE injector 20 supplies electrical power to two (2) or more different groups of PDs 518 and different individuals are responsible for each group of PDs 518.

"Setup" Page

Selecting the word "Setup" in the home page, or in any of the other pages, causes a "Setup" page to appear at the host computer's browser. The administrator uses the "Setup" page, that appears in FIG. 8, for configuring operation of the PoE injector 20. The "Setup" page permits assigning:
1. a "Controller name" to the PoE injector 20;
2. names to outlets 1 through 8 of the PoE injector 20;
3. time delay intervals associated with various events performed by the PoE injector 20;
4. a default recovery procedure to be executed if the PoE injector 20 were to loose electrical power;
5. URLs identifying four (4) Web pages external to the PoE injector 20 that will appear in the four (4) lowest links of the link table that appears at the upper left hand side of each Web page;
6. different IP addresses, each IP address having a format that is well known to those who are familiar with IP addressing issues, for the PoE injector 20 thereby overwriting the default IP address for the PoE injector 20;
7. credentials for the administrator of the PoE injector 20;
8. an access control "user name" and password for each of the eight (8) pairs of interconnected RJ45 sockets included in the RJ45-2×8 double deck gang socket 24;

9. access settings for the entire PoE injector 20;
10. an access control "user name" and password for each of the eight (8) pairs of interconnected RJ45 sockets included in the RJ45-2×8 double deck gang socket 24; and
11. access settings for the entire PoE injector 20.

Figure 8:
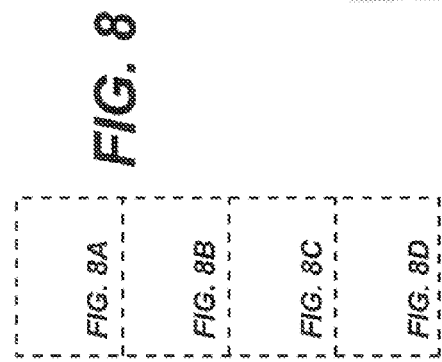
FIG. 8 depicts an order for concatenating FIGS. 8A-8D in assembling a Web Browser's image of a "Setup" page transmitted from the internal Web server included in the PoE injector of FIG. 1.
Figure 8B:
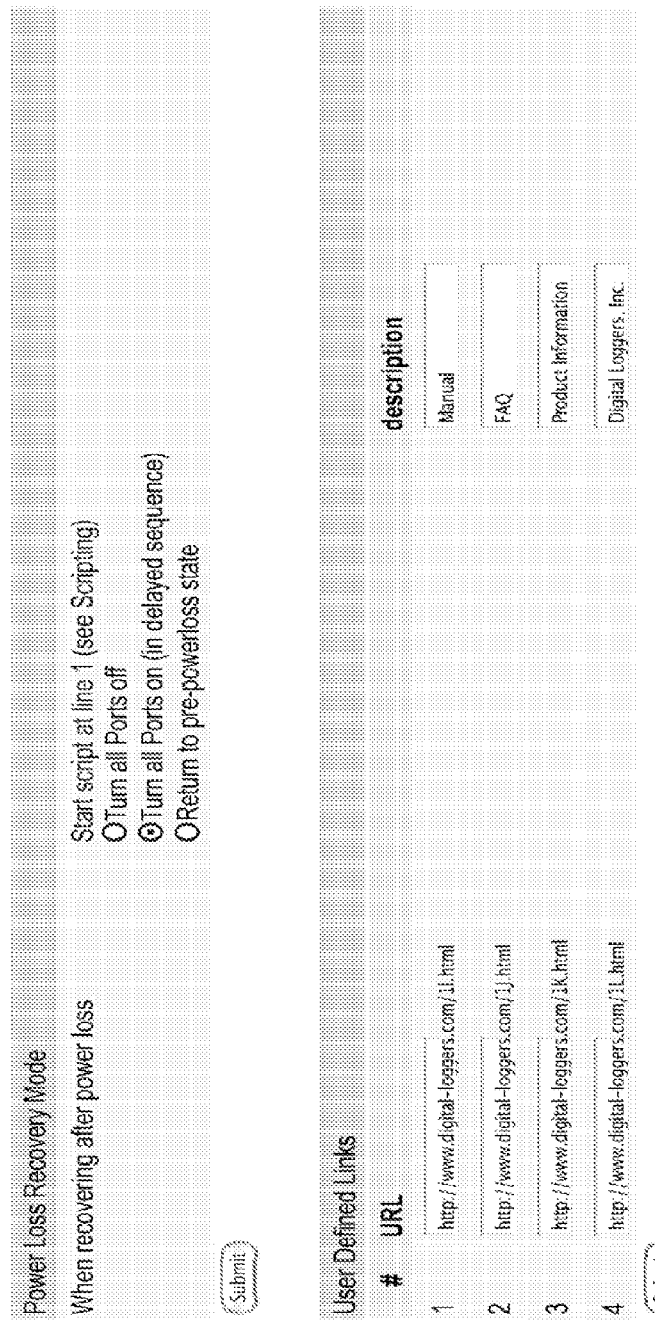
Figure 8A:
Figure 8D:
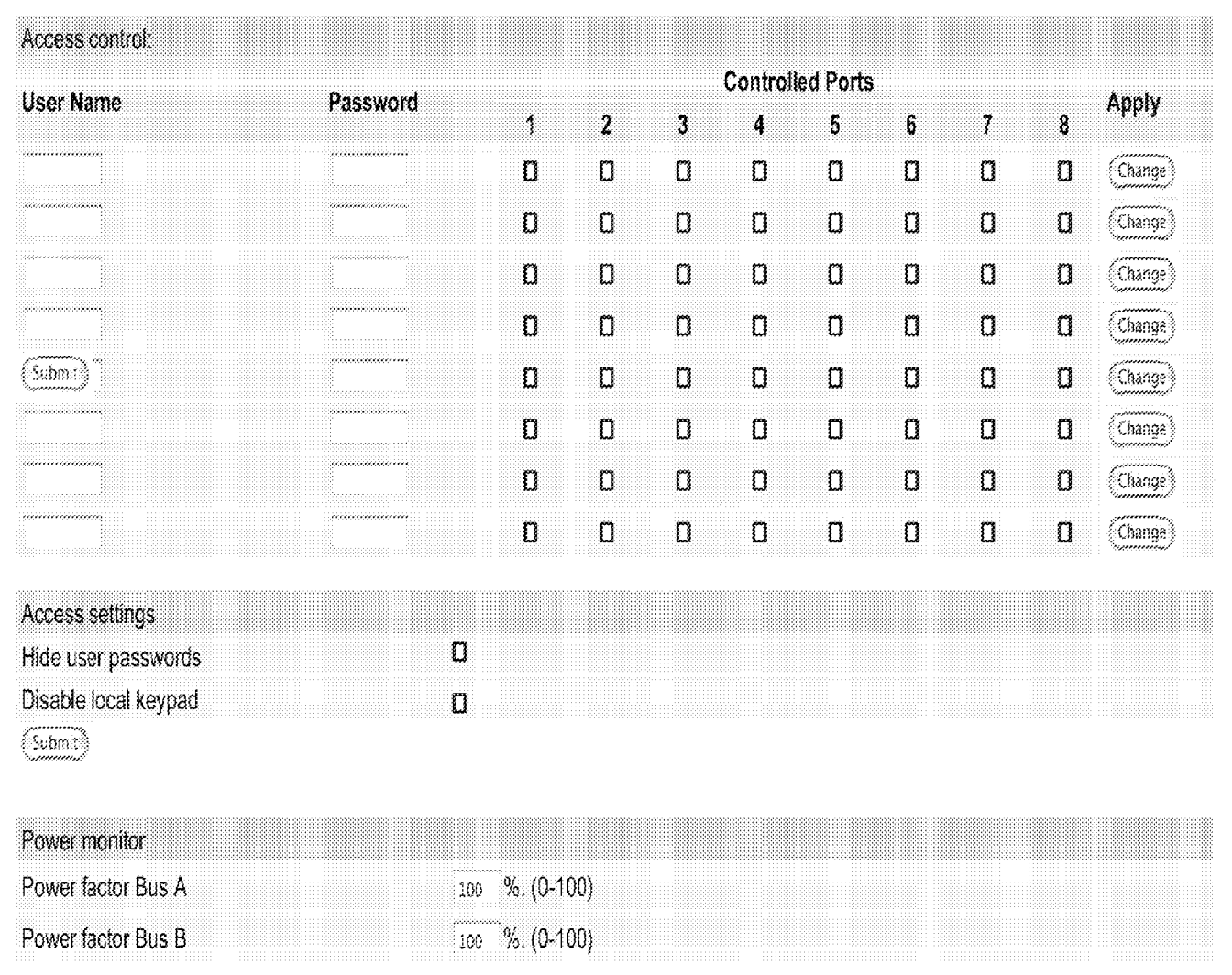

A "Unit Names" block at the top of the "Setup" page permits assigning a name to the PoE injector 20 which, in the illustration of FIG. 8, is named "Main Site PoE Injector". The "Unit Names" block also permits assigning identifying names to each pair of interconnected RJ45 sockets included in the RJ45-2×8 double deck gang socket 24. Names for each of these pairs of RJ45 sockets such as "UBNT WiFi AP 1," "UBNT WiFi AP 2," "PoE Switch 1," "PoE Security Camera 11"," "PoE Security Camera 2," "PoE Security Camera 3," "VoIP Phone 1" and "VoIP Phone 2" appear in the illustration of FIGS. 7 and 8.

A "Delay" block in FIG. 8's "Setup" page permits assigning a time value to:
1. a "Wrong password lockout" interval;
2. an "ON sequence delay" interval which specifies an interval between supplying electricity to successive PDs 518 that receive electrical power from the RJ45-2×8 double deck gang socket 24;
3. a time interval between the internal Web server's refreshing the Web page appearing at the host computer; and
4. enabling or disabling Web page refreshing.

A "Wrong password lockout" field in the "Setup" page's "Delay" block permits specifying a time interval during which the PoE injector 20 becomes inaccessible from a host computer's browser after three successive failed log-in attempts. An interval between zero (0) and sixty (60) minutes may be assigned advantageously to the "Wrong password lockout" field.

The "On sequence delay" helps prevent power surges and triggering circuit breakers which may occur if multiple PDs 518 receive electrical power simultaneously. The delay is also useful for allowing PD 518 radios time for rebooting. A delay of sixty (60) seconds between supplying electricity to each successive interconnected pair of RJ45 sockets included in the RJ45-2×8 double deck gang socket 24.

The "Power Loss Recovery Mode" block in FIG. 8's "Setup" page permits selecting one of three alternative response strategies after the PoE injector 20 resumes receiving electrical power following an electrical power interruption.
1. Selecting the top alternative specifies that electrical power will not be restored to any pair of interconnected RJ45 sockets included in the RJ45-2×8 double deck gang socket 24 until authorized from the host computer's browser.
2. Selecting the middle alternative specifies that electrical power will be restored successively to each pair of interconnected RJ45 sockets included in the RJ45-2×8 double deck gang socket 24 with each successive power restoration separated by the delay specified in the "ON sequence delay" field described above.
3. Selecting the lower alternative specifies that electrical power will be restored to only those pairs of interconnected RJ45 sockets included in the RJ45-2×8 double deck gang socket 24 that were being energized prior to the electrical power interruption, with each successive power restoration separated by the delay specified in the "ON sequence delay" field described above.

Note that if a script has been written specifying operation of the PoE injector 20 and scripted operation has been enabled, rather than any of the three preceding alternatives the PoE injector 20 automatically executes the script upon restoration of electrical power.

A "User Defined Links" block in FIG. 8's "Setup" page permits specifying a maximum of four (4) URLs for linking to a maximum of four (4) different:
1. power controllers;
2. web pages; and/or
3. remote web sites.

The "User Defined Links" block also permits entering a text naming each of the URL entered. The names entered for each URL appear on all seven (7) of the internal Web server pages transmitted from the PoE injector 20 to the host computer's browser.

When initially installing the PoE injector 20, a "Network" block in FIG. 8's "Setup" page permits replacing the default IP address for the Web server with an IP address, a network mask, and a gateway for the PoE injector 20. The IP address, network mask, and gateway assigned to the PoE injector 20 must be valid for the LAN to which the RJ45 socket 26 connects. When changing the IP address, network mask, and gateway, it may be necessary to restart the PoE injector 20 together with any network switches to validate the new IP address, network mask, and gateway connected to an "auto-configuring" switch's port. Any newly assigned IP address, network mask, and gateway should be recorded somewhere else for future reference. A "Protect" button at the right hand side of the "Network" block on the "Setup" page permits locking the network settings. Once locked, the network settings can be changed only after pressing with a small diameter length of wire, such as that provided by an opened paper clip, a physical reset button 252. In FIG. 1, the reset button 252 appears adjacent to the lower right hand corner of the RJ45 socket 26, and also in FIG. 2A block diagram.

An "Administrator credentials" block in FIG. 8's "Setup" page permits the administrator to change the administrator's log-in "user name" and password.

An "Access control" block in FIG. 8's "Setup" page permits an administrator of the PoE injector 20 to grant others control of specified pairs of interconnected RJ45 sockets. In granting control over individual pairs of interconnected RJ45 sockets to others, the administrator enters a "user name" and a password in the "Access control" block for each pair of interconnected RJ45 sockets being designated for that individual's control.

"Scripting" Page

Figure 9:
FIG. 9 presents a Web browser's image that provides an example of a "Scripting" page transmitted from the internal Web server included in the PoE injector of FIG. 1 to a host computer's Web browser that an administrator uses in preparing a script for controlling the PoE injector's operation.

FIG. 9 provides an example of a "Scripting" page transmitted from the internal Web server included in the PoE injector 20 to a host computer's Web browser. An administrator may use the "Scripting" page to enter scripting language commands used in a script for controlling operation of the PoE injector 20. The scripting language can be used to create custom control and reboot sequences, schedule periodic reboots, customize the information presented on the LCD 28 such as PoE voltage monitors. Programmable scripts can also create customized power-up and power-down sequences with variable "On sequence delay" intervals. The scripting language using BASIC commands lets an administrator customize operation of the PoE injector 20. A script's execution may be started manually, automatically on power-up, by external http command, or as a result of an AutoPing event.

The software controlling operation of the PoE injector 20 executes scripts that specify customized procedures for managing the operation of each of the pairs of interconnected RJ45 sockets included in the RJ45-2×8 double deck gang socket 24. For most individuals, using the scripting language requires no computer programming experience.

Hardware Requirements

User-defined scripts are stored in a non-volatile EEPROM included in the PoE injector 20.

Entering Scripts

As illustrated in the FIG. 9 Web browser's image of a "Scripting" page, a script's individual commands are entered on successive lines in the Web page. Selecting EDIT or pressing a keyboard's return key copies that line's command to a common code space. If the command is syntactically incorrect, the Web browser's image will be refresh without any changes. After entering a script, marking the "Enable Scripting" checkbox on the "Scripting" page permits the PoE injector 20 to run the script. After enabling script execution, a "Run" button replaces the "Edit" button located along the right hand side of the "Scripting" page depicted in FIG. 9. Pressing the "Run" button causes the PoE injector 20 to perform the associated script's command. Alternatively, other events described in greater detail below can initiate script execution.

Supported Commands

You may enter up to 127 of the permitted commands. Commands are executed in the sequence appearing in a script with a "step delay" between each command. The step delay can be as short as 1 second (one command per second) or slower if desired. BASIC commands selected from the following list are entered one after the another on successive lines in the "Scripting" page followed by selecting the "Edit" button after entering each command.

Multiple Threads

A thread specifies is a process usually for controlling the PoE injector 20 in a specified way. The PoE injector 20 can run concurrently:

1. multiple processes; or
2. the same process up to 63 times.

Multiple scripts may specify multiple threads. Scripts share a common code space. Up to 63 threads may run concurrently. Care must be exercised when starting threads. Multiple simultaneous threads may be easily started unintentionally.

Figures 6, 6A:
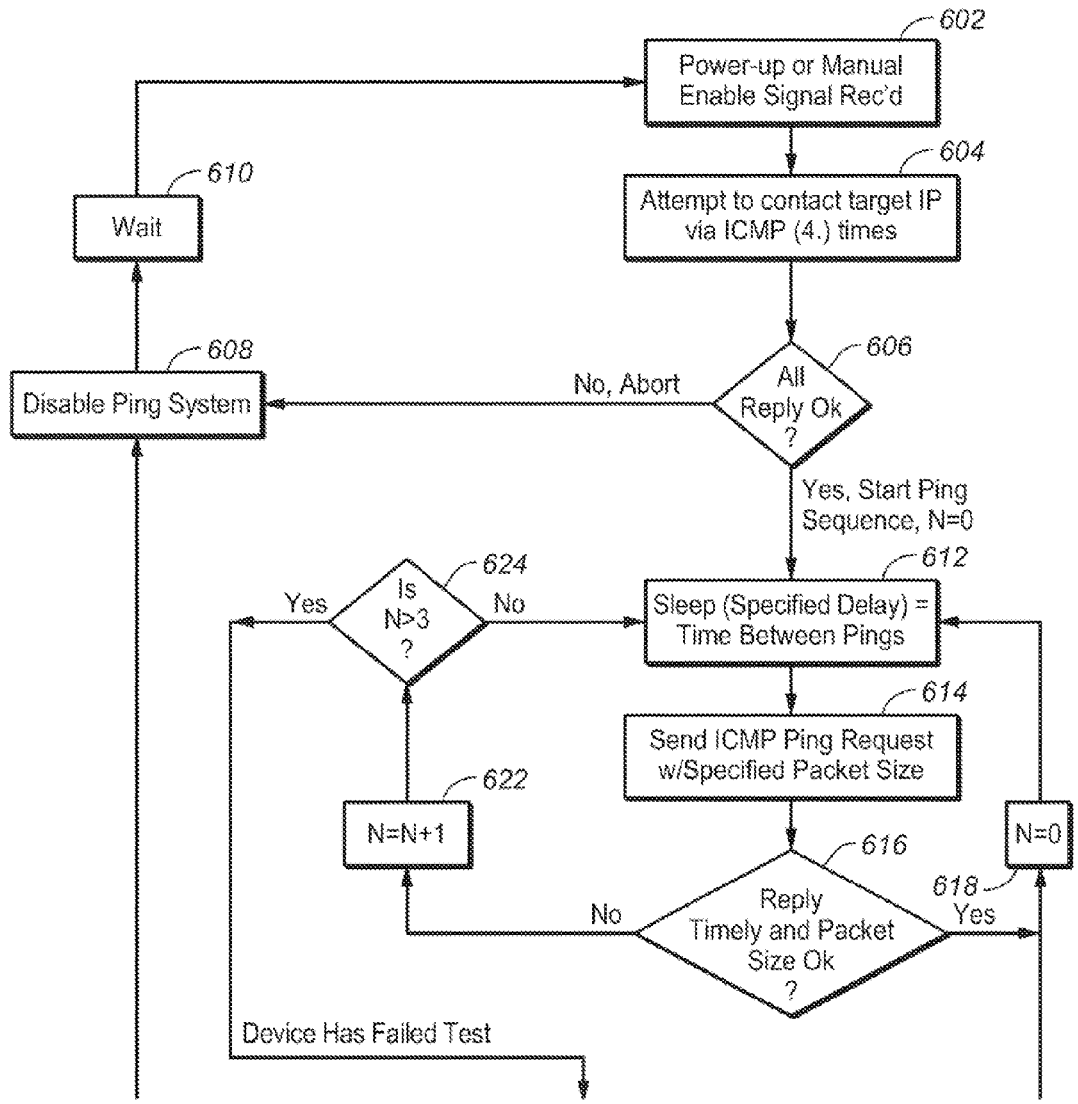
FIG. 6 depicts the relationship between FIGS. 6A and 6B, the combined FIGS. forming a decisional flow chart for an "AutoPing" operation performed by the PoE injector in monitoring operational status of a PD connected thereto, and in attempting to restore the connected PD to an operating condition if the PoE injector determines that the PD is no longer operating.
FIG. 6A is a portion of the functional flow chart for the "AutoPing" operation performed by the PoE injector.
Figure 6B:
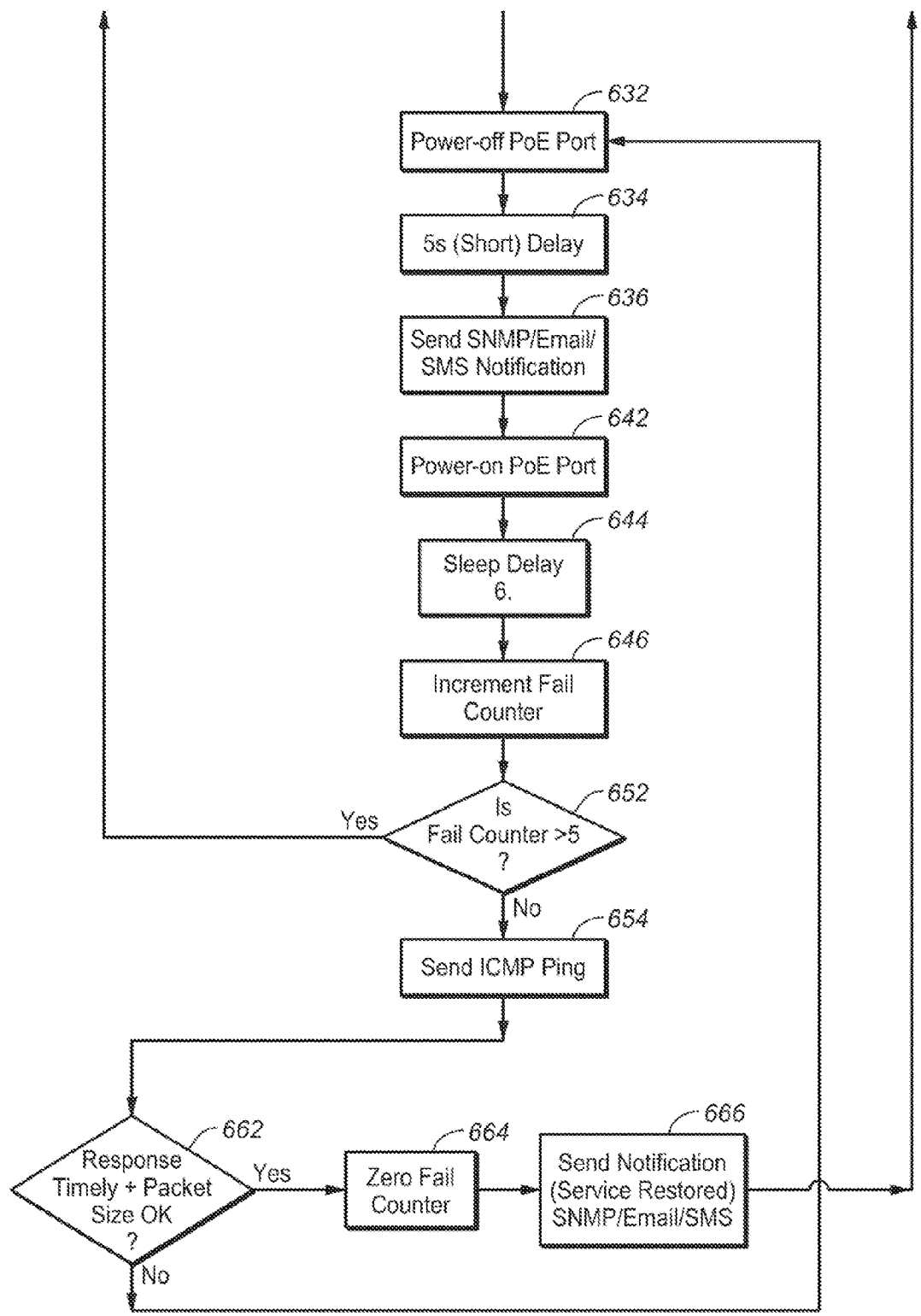
FIG. 6B is another portion of the functional flow chart for the "AutoPing" operation performed by the PoE injector.
Figure 6C:
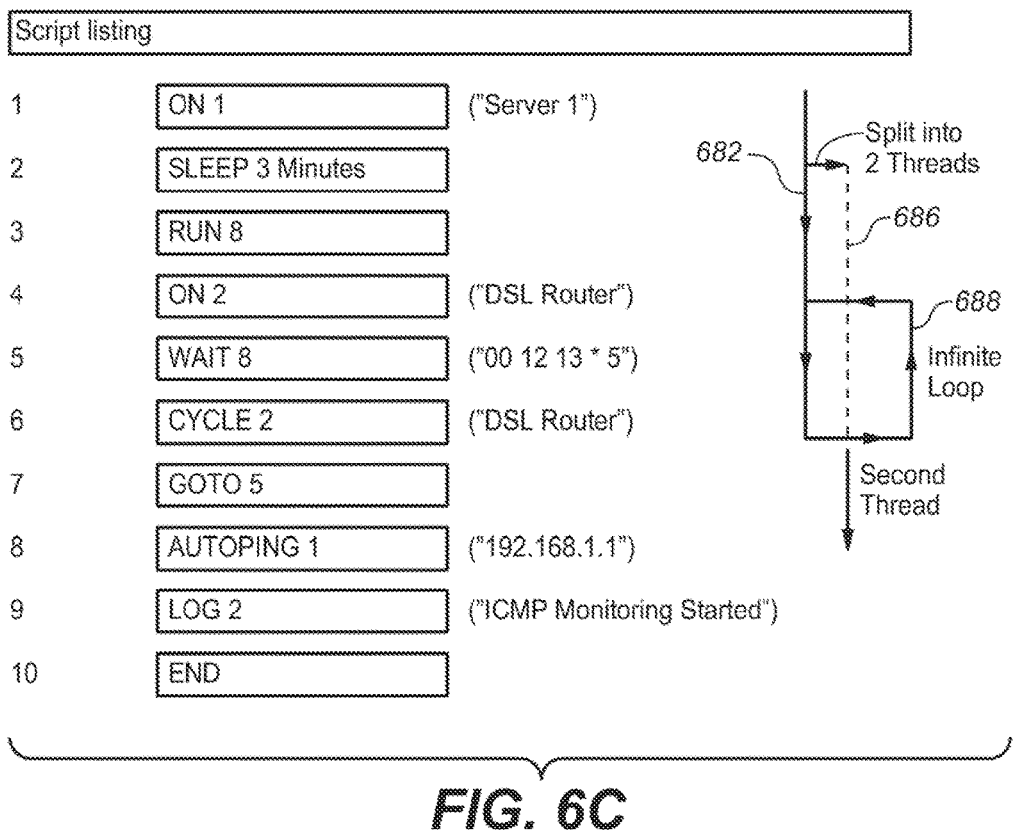
FIG. 6C illustrates a multi-threaded script of a type an administrator can prepare for controlling operation of the PoE injector.

FIG. 6C illustrates a multi-threaded script of a type an administrator might prepare for programming operation of the PoE injector 20. Step no. 1 in the script's listing, that appears along the left hand side of FIG. 6C, commences execution of a first thread 682 by turning on power to port 1 of the PoE injector 20, i.e. the PoE injector 20 supplies electrical power to RJ45-2×8 double deck gang socket 24 no. 1 depicted in FIG. 1. A comment "Server 1" that appears to the right of the script's step no. 1 command "ON 1" indicates that a first LAN cable 514 is to supply electrical power to that particular PD 518 from the RJ45-2×8 double deck gang socket 24 no. 1.

Step no. 2 in the script's listing specifies that the programmed controller 34 is to pause executing the script for three (3) minutes while "Server 1" commences operating, i.e. boots up. The next step no. 3 specifies that while the programmed controller 34 is to continue executing first thread 682, it is also to commence executing a second thread 686 at step no. 8 in the script's listing.

Step no. 4 in the script listing for first thread 682 specifies that power is to be turned on to port 2 of the PoE injector 20, i.e. the PoE injector 20 supplies electrical power to RJ45-2×8 double deck gang socket 24 no. 2 depicted in FIG. 1. A comment "DSL Router" that appears to the right of the script's step no. 2 command "ON 2" indicates that a second LAN cable 514 is to supply electrical power to that particular PD 518 from the RJ45-2×8 double deck gang socket 24 no. 2. Step no. 5 in the script's listing for first thread 682 specifies that the programmed controller 34 is to pause executing the script until Friday the 13th at noon as indicated by the comment to the right of the "WAIT 8" command.

Step no. 6 in the script listing for first thread 682 specifies that on Friday the 13th at noon the PoE injector 20 is to cycle electrical power to port no. 2, i.e. turn electrical power to the "DSL Router" first off and then on, thereby clearing and resetting the "DSL Router." Step no. 7 in the script listing for first thread 682 causes the thread's execution begin executing a loop 688 by returning to step no. 5 to again pause the first thread 682 until Friday the 13th at noon.

Meanwhile, concurrently with the execution of the first thread 682 by the programmed controller 34, the programmed controller 34 begins executing second thread 686 in step no. 8 by initiating starting an "AutoPing" operation for IP address "192.168.1.1" as indicted in step. no. 8's comment. As described in greater detail below, the "AutoPing" operation determines if a device at IP address "192.168.1.1" is operating and automatically reboots that device without human intervention if the PoE injector 20 determines that the device is sufficiently unresponsive. Then in step no. 9 the second thread 686 sends a report to a SYSLOG server that the comment to the right of step no. 9 indicates that "ICMP Monitoring Started." After sending the message to the SYSLOG server, execution of loop 688 in step no. 10 stops executing.

Starting Scripts

There are several ways for starting scripts:

On power up

This feature automatically starts a script at Line 1 when scripting is enabled and power is first applied to or upon power being restored to the PoE injector 20. An erroneous script can be easily terminated by pressing the reset button 252 to disable scripting. If a script will never be executed "on power up," insert the "END" command in the script's Line 1. Commands for a script that will never be executed "on power up" begin in Line 2 or further down on the "Scripting" page.

By another thread—RUN NNN

One thread can initiate execution of another thread by using the RUN NNN command. For example, if a script's Line 10 contains the command "RUN 50," then execution of Line 10 initiates a new thread that begins with the command appearing in the script's line 50. After executing the "RUN 50" command in Line 10, execution of the initiating thread continues with the command appearing in the script's Line 11.

By Entering a URL

To initiate a script's execution via a URL, a user must first successfully log into the internal Web server of the PoE injector 20 by entering a "user name" and that user name's password. After logging into the Web server of the PoE injector 20, entering the URL http://Your_IP/script?runNNN=run into the browser's command line and pressing the keyboard's return key starts execution at the script's line NNN. For example, entering:

http://192.168.0.100/script?run100=run starts script execution at Line 100.

Using cURL or a Similar Function

Scripts can be authenticated and started using a cURL tool which permits conveniently sending HTTP commands without the command's being typed into the browser's command line. Library and command line versions of the cURL tool are available via the Internet. For example. entering the cURL: http://admin:

1234@192.168.0.100/script?run100=run into the browser's command line and pressing the keyboard's return key starts a script's execution at Line 100 at the specified IP address after authenticating admin with admin's password 1234.

Via Programmable Web Links

The programmable web links along the left side of the page can be used for starting a script by entering "script?run002" in the "User Defined Links" section of the "Setup" page for the internal Web server of the PoE injector 20. Using the "User Defined Links" section of the "Setup" page in this way effectively establishes a desktop shortcut icon within the internal Web server for starting the script.

By Manually Clicking the "Run" Button

As described above, marking the "Enable scripting" box on the "Scripting" page causes a "RUN" button's appearance to the right of script lines. Pressing a "Run" button causes the PoE injector 20 to perform the script's command.

Via AutoPing

The AutoPing feature of the PoE injector 20 can be configured for automatically starting a script's execution upon loosing IP connectivity to a PD 518. Entering the script's line number where execution is to begin on the "AutoPing" page in the "Script" box located to the right of IP address enables the script's execution upon loosing IP connectivity to the specified PD 518.

Enabling/Disabling Scripting

Before editing a script, scripting must be disabled on the "Setup" page thereby stopping all threads. After editing a script, scripting must be enabled on the "Setup" page before any script will start executing. Pressing the hardware reset button 252 resets the PoE injector 20 to the default login and disables scripting.

Stopping a Script

A script automatically terminates upon reaching the script's END command. Clicking on the "Scripting" pages "Stop all running threads" button terminates execution manually. After logging into the Web server of the PoE injector 20, all scripts' execution can also be terminated by entering:

http://Your_IP/script.cgi?stop into the browser's command line and pressing return.

Relay Debounce Warning

Even with the scripting step delays, it is possible to create a script which will rapidly cycle a relay supplying electrical power to a pair of interconnected RJ45 sockets included in the RJ45-2×8 double deck gang socket 24. This rapid relay cycling could cause an over current condition, tripped breaker, stress the power controller or attached equipment. To protect against damage to attached equipment or to the power controller, the response time of relays is limited by hardware to about 500 ms. To avoid excessively rapid relay cycling, scripts should be tested Before running multiple threads.

Scripting Command Format

Text enclosed within parentheses indicate a variable's definition. A scripting command that includes the Line number of the variable's definition without parenthesis uses the variable defined in that line. For example, a script line that contains "AUTOPING 1" executes an AutoPing for the IP address stored in the script's Line 1.

AutoPing (N)

This command enables performing AutoPing at the IP address specified in the script's Line N. For example, if the script's Line 1 specifies the IP address 192.168.0.101 by enclosing the IP address within parenthesis, in accordance with the "Setup" page's settings AutoPing will be performed to the IP address specified in the script's Line 1. Note that an AutoPing operation begins only after a series of successful pings are used for confirming a reliable connection to the specified IP address.

NOP No operation

Scripts can include a NOP command usefully for debugging the script, to create a delay, or as a target for a GO TO script command. Execution of a script's NOP command causes a delay equal to the program step delay that is equivalent to a script's SLEEP 0 command.

END Ends Execution

A thread's execution that encounters a script's END command terminates the thread's execution. Only the thread that encounters the script's END command stops.

RUN (L) Create Thread

Thread execution that encounters a script's RUN (L) command starts execution of a new thread at line number (L) in the script.

GOTO (L) Branch

Thread execution that encounters a script's GOTO (L) command unconditionally branches to line number (L) in the script.

GOSUB (L) Subroutine Call

Thread execution that encounters a script's GOSUB (L) command begins executing a subroutine at the script's Line (L). The GOSUB (L) command is used in conjunction with a script's RETURN command.

Return

Thread execution that encounters a script's RETURN command resumes script execution at the line following the GOSUB command that began the subroutine's execution. Note: a subroutine is "emulated" by starting a thread. The script line where the GOSUB (L) occurs counts as a thread, and the script lines beginning at Line (L) count as another thread. This can be a significant consideration in implementing scripts since only 63 simultaneous threads are allowed.

ON (NN) Activate Relay

An ON (NN) command energizes specified relays for supplying electrical power to particular pairs of interconnected RJ45 sockets included in the RJ45-2×8 double deck gang socket 24. For example, the script command "ON 123" turns on electrical power to pairs of interconnected RJ45 sockets 1, 2 and 3 included in the RJ45-2×8 double deck gang socket 24 leaving pairs of interconnected RJ45 sockets 4-8 unaffected. The argument (NN) for the "ON" command is a list. The command "ON 1357" sequentially supplies electrical power to the odd numbered pairs of interconnected RJ45 sockets. To prevent excessive inrush electrical currents, the sequence delay timer, i.e. the value specified in "On Sequence Delay" in the delay section of the "Setup" page, separates energizing each relay in a sequence of relays specified in a multi-relay ON command. (For Deutsches Institut für Normung e.V., in English the German Institute for Standardization, ("DIN") relays, activating a relay closes the NO contacts and opens the NC contacts.}

OFF (NN) Deactivate Relay

An OFF (NN) command denergizes specified relays for supplying electrical power to particular pairs of interconnected RJ45 sockets included in the RJ45-2×8 double deck gang socket 24. For example, the script command "OFF 123" turns off electrical power to pairs of interconnected RJ45 sockets 1, 2 and 3 included in the RJ45-2×8 double deck gang socket 24 leaving pairs of interconnected RJ45 sockets 4-8 unaffected. The OFF command acts immediately, i.e. without any delay in denergizing the relays. (For a DIN relay, deactivating a relay closes the NC contacts and opens the NO contacts.)

RESTORE Restores All Relays

After a restoration of electrical power to the PoE injector 20, the occurrence of a RESTORE command in a script returns all relays to the settings as they existed before the power loss in numeric sequence, i.e. to the relays' "pre-powerloss" state. A delay interval separates each successive relay energization as described above for the "ON (NN)" command.

CYCLE (NN) Cycles Relays

A CYCLE command turns the specified relays OFF and the back ON. For example, CYCLE 13 first turns relays 1 and 3 off, and then turns them back on with the delay interval described above for the "ON (NN)" command interposed between each successive relay energization. Cycling relays first off and then on causes PDs 518 receiving electrical power from pairs of interconnected RJ45 sockets included in the RJ45-2×8 double deck gang socket 24 to reboot.

BEEP (T) Activate Beeper

A BEEP (T) command activates audio alarm included in the PoE injector 20. Use BEEP ON to start a continuous alarm, and BEEP OFF to stop a continuous alarm. The beeper can also be activated for 1-254 seconds with a BEEP command, e.g. BEEP 120 starts the beeper sounding for 120 seconds. BEEP 0 is equivalent to BEEP OFF. BEEP 255 is equivalent to BEEP ON.

SLEEP (T) Sleep Delay

A SLEEP (T) command causes the thread pause execution for a specified interval. Delay length can be specified in hours, minutes or seconds. The SLEEP (T) command is useful in scripts specifying a periodic operation such as weekly reboots of PDs 518. "SLEEP 1 S" pauses thread execution for one (1) second. "SLEEP 2 H" pauses thread execution for sleeps for two (2) 35 hours. "SLEEP 3 D" pauses thread execution for three (3) days. Numerical values included in a "SLEEP (T)" command must be between 0 and 255.

LOG ($) Report to Syslog

A LOG ($) command causes the PoE injector 20 to send the string variable ($) specified in the script to the SYSLOG server specified by the IP address entered on the "Setup" page.

Display ($)

Causes the PoE injector 20 to display on the LCD 28, in accordance with formatting commands described below, text specified by a text string ($) defined within the script. The LCD is organized as two (2) lines each line containing 16 characters.

String Variables

A script may define a literal string of text, e.g. "HELLO WORLD". A string may also include text generated by the PoE injector 20. % strings listed below are automatically generated and updated by the PoE injector 20:

%% literal "%"
% o—Outlets state in the form "12456" (ON are displayed)
% O—Outlets state in the form "++−+++−−"
% n—Serial number
% f—Firmware version
% d—System time/date
% M—MAC address of the power controller
% i—IP address of the power controller
% m—IP network mask
% g—IP gateway Special formatting characters may be generated using "\" escape sequences. Special characters generated this way are useful for the DISPLAY command. Listed below are the various escape sequences together with a description of their effect on the LCD display.

\\ prints the literal "\" character to the LCD
\1—position cursor Line 1 beginning
\2—position cursor Line 2 beginning
\f—clear LCD screen
\n—new line
\r—carriage return (LCD does not scroll)
\v—clear to the end of the current line

TIME ($)

The TIME command synchronize with a Network Time Protocol ("NTP") server identified by the server's IP address (string $).

KILL (NNN)

KILL terminates execution of all threads started at Line NNN except for the current thread. KILL 0 terminates execution of all threads.

WAIT ($)

Unlike the "SLEEP" command which pauses script execution for a specified time interval, the "WAIT" command pauses script execution until a specified time and date occurs on a real time clock included in the PoE injector 20. The format of the "TIME" command argument resembles that of a popular crontab entry, i.e. five fields separated by spaces. Each field is either an asterisk (meaning any value) or a number. Possible numerical ranges for each of the argument's five (5) fields appear below.

| | | |
|---|---|---|
| 1 Minute | 0-59 | |
| 2 Hour | 0-23 | |
| 3 Day of month | 1-31 | |
| 4 Month | 1-12 | |
| 5 Day of week | 0-7 | Sunday is 0 or 7 |

Note, that the condition is satisfied if all fields match. For example the script

1 ON 3
2 WAIT 00 12 13 * 5
3 CYCLE 3
4 GOTO 2 reboots the PD 518 energized from the third pair of interconnected RJ405 sockets included in the RJ45-2×8 double deck gang socket 24 every Friday the 13th at noon. (Note that the cron daemon treats the preceding time specification differently, i.e. the wait would expire each Friday and on the 13th of each month.)

"Date/Time" Page

Figure 10:
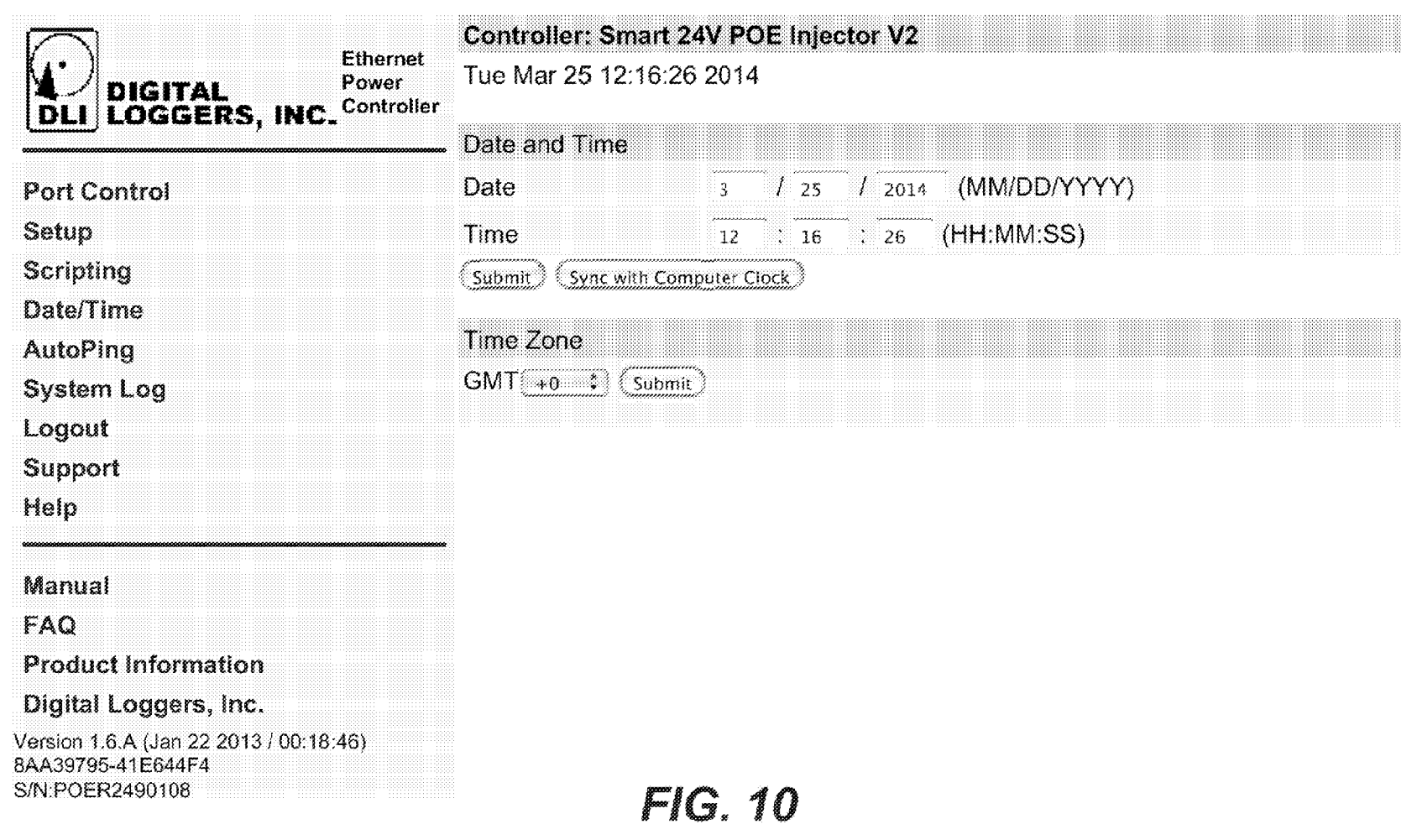

FIG. 10 depicts a "Date/Time" page transmitted from the internal Web server included in the PoE injector 20 of FIG. 1 to a host computer's Web browser that an administrator uses for assigning a date and time to a clock included in the PoE injector 20.

"AutoPing" Page

Figure 11:
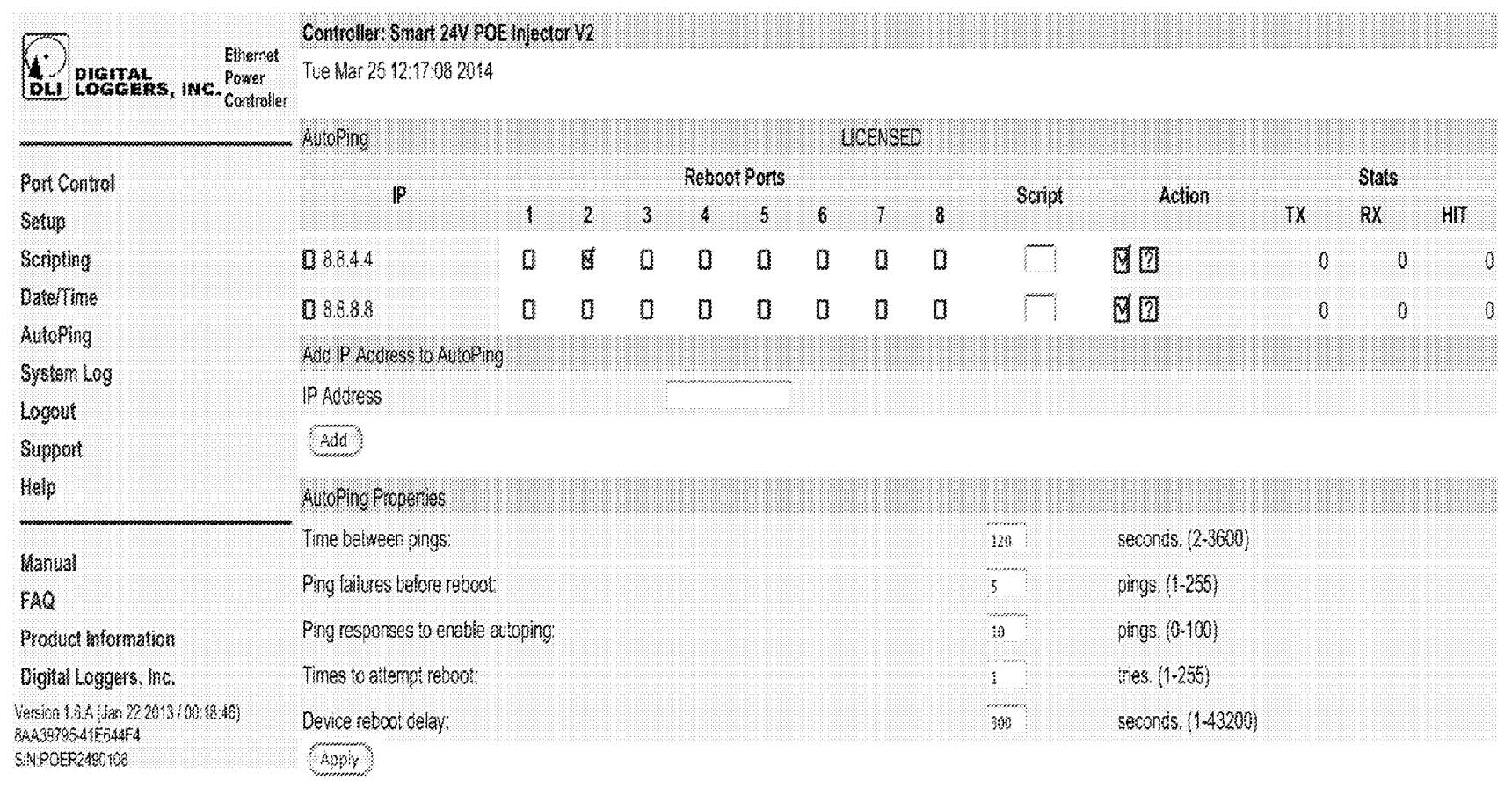

AutoPing is a process determining if a PD 518 is operating and for for automatically rebooting an unresponsive PD 518 without human intervention. If a PD 518 becomes sufficiently unresponsive to Internet Control Message Protocol ("ICMP") "ping" interrogation packets, AutoPing attempts to reboot PDs 518 by cycling the PD's electrical power. FIG. 11 provides an example of a "AutoPing" page transmitted from the internal Web server included in the PoE injector 20 to a host computer's Web browser.

To set up an AutoPing, an administrator first specifies an IP Address of a PD 518 to which the PoE injector 20 will periodically transmit IP "ping" interrogation packets, and then await responses thereto. After specifying the IP address of the PD 518, by marking checkboxes the administrator specifies those pairs of interconnected RJ45 sockets included in the RJ45-2×8 double deck gang socket 24 for which power will be cycled if the PD 518 fails to respond to "ping" interrogation packets. The administrator can specify IP addresses for different PDs 518 to which "ping" packets will be sent on successive lines of the "AutoPing" page.

As indicated near the bottom of FIG. 11, the administrator also specifies AutoPing's operating characteristics on the "AutoPing" page. Five different settings that are unique for each IP address control AutoPing operating characteristics.

Time Between Pings
This field specifies a time interval between transmitting "ping" interrogation packets to the specified IP address (es). 60 seconds between successive "ping" interrogation packets should be useful for most applications.

Ping Failures Before Reboot
This field specifies a number of failed communications attempts that must occur sequentially before attempting to reboot am unresponsive PD 518. For example, when set to 5, the specified PD 518 must fail to respond to 5 successive "ping" interrogation packets before AutoPing cycles electrical power to the specified pairs of interconnected RJ45 sockets included in the RJ45-2×8 double deck gang socket 24. Since network overloads and missed interrogation and/or reply packets can occur occasionally during normal network operation, between 5 and 10 failed communications attempts is recommended before cycling electrical power.

Ping Responses to Enable AutoPing
This fields specifies a number of successive "ping" interrogation packets to which the PoE injector 20 must receive a response from the PD 518 before AutoPing becomes enabled for cycling electrical power to the specified pairs of interconnected RJ45 sockets included in the RJ45-2×8 double deck gang socket 24 if the PD 518 were to subsequently stop responding to "ping" interrogation packets.

Times to Attempt Reboot
If a PD 518 becomes unreliable, this field sets a maximum number for how many times electrical power to the specified pairs of interconnected RJ45 sockets included in the RJ45-2×8 double deck gang socket 24 will be cycled without the PD 518 responding to "ping" interrogation packets. For example, entering the number 5 limits AutoPing's cycling of electrical power to the specified pairs of interconnected RJ45 sockets included in the RJ45-2×8 double deck gang socket 24 5 times before AutoPing ceases trying to reboot the unresponsive PD 518.

Device Reboot Delay
After rebooting a PD 518 with a cold-boot power-off, AutoPing should wait for a specified interval before sending "ping" interrogation packets to the IP address. This field permits specifying an interval following cycling of electrical power to the specified pairs of interconnected RJ45 sockets included in the RJ45-2×8 double deck gang socket 24 to provide sufficient time for the PD 518 to complete its rebooting process. For example, a typical value for a PD's rebooting would be at least three (3) minutes, and depending upon the specific type of PD 518 could be longer. Entering 180 causes the PoE injector 20 to start checking the PD 518 for normal operation three (3) minutes after the PD 518 begins rebooting.

After specifying AutoPing's operating characteristics, to start sending "ping" interrogation packets to a particular PD 518 the administrator:
1. marks the checkbox immediately to the left of the IP address of the PD 518 that is to receive "ping" interrogation packets; and
2. clicks on the checkbox button for that IP address that is in the left hand column of checkboxes beneath the word "Action."

Terminating AutoPing to a PD 518 for which AutoPing is operating essentially requires repeating the preceding process. To terminate AutoPing the administrator:
1. unmarks the checkbox immediately to the left of the IP address of the PD 518 for which AutoPing is then operating and is to be terminated; and
2. clicks on the checkbox button for that IP address that is in the left hand column of checkboxes beneath the word "Action."

The "AutoPing" page also permits starting a script's execution by entering the script's line number where execution is to begin in an IP address' row of "AutoPing" page data. AutoPing initiates script execution at the specified line number when a specified PD 518 fails to respond to the number of successive IP "ping" interrogation packets designated in the AutoPing page's "Ping failures before reboot" field. The converse operation is also available. That is, as described above a script command can start AutoPing's operation for a specified IP address.

Finally, the right hand of the "AutoPing" page includes a report detailing the numbers of:
1. "ping" interrogation packets transmitted;
2. "ping" interrogation packet responses received; and
3. "hits," which counts the number of transmitted "ping" interrogation packets to which the specified PD 518 fails to respond within the interval designated in the AutoPing page's "Time between pings" field.

FIGS. 6A and 6B form a decisional flow chart for the "AutoPing" operation in:
1. monitoring operational status of a PD 518; and
2. attempting to restore the PD 518 to an operating condition if the PoE injector 20 determines that the PD 518 is no longer operating.

If there exists a script specifying that an "AutoPing" operation is to be performed for a specified PD 518, upon initially powering up the PoE injector 20 the "AutoPing" operation commences in block 602 for the specified IP address. Alternatively, the "AutoPing" operation begins in block 602 directly from the "AutoPing" Page as described above. In block 604, "AutoPing" attempts to contact a specified PD 518 by sending four (4) successive ICMP "ping" packets to the specified IP address. In decision block 606 "AutoPing" checks to determine whether the specified PD 518 has replied to all four (4) "ping" packets. If there has been no reply to any of the four (4) "ping" packets, in block 608 "AutoPing" disables "AutoPing" for the specified IP address. After disabling "AutoPing" for the specified IP address, "AutoPing" waita an interval of time in block 610 before returning to block 602.

If the PD 518 has replied to all four (4) "ping" packets, after initializing both a counter "N" and a "Fail Counter" to zero (0) then "AutoPing" begins a "ping" sequence in block 612 by waiting the specified time between sending "ping" packets. After the specified time between sending "ping" packets has elapsed, in block 614 "AutoPing" then sends a "ping" packet of a specified packet size to the specified IP address. In decision block 616 "AutoPing" assesses whether a reply to the "ping" packet was both timely and reports the proper packet size. If the reply was timely and reports the proper packet size, "AutoPing" returns to block 612 via a block 618 which sets the counter "N" to zero (0), and again waits the specified time between sending "ping" packets.

If in decision block 616 "AutoPing" determines that the reply to the "ping" packet was untimely or reported an improper packet size, "AutoPing" in block 622 adds one (1) to the counter "N". Then in decision block 624 "AutoPing" checks the counter "N" and returns to block 612 if the counter "N" is less than four (4). If in decision block 624 the counter "N" exceeds three (3), then "AutoPing" proceeds to block 632 whereupon the programmed controller 34 transmits a signal which turns off electrical power to the RJ45-2×8 double deck gang socket 24 to which a LAN cable 514 connects the specified PD 518.

After waiting in block 634 a short time after electrical power to the specified PD 518 has been turned off, as specified the programmed controller 34 in block 636 sends information about the failure via the RJ45 socket 26 as either a SNMP message, an E-mail, or a notification via the Short Message Service ("SMS"). After sending information about the failure in block 636, the programmed controller 34 in block 642 transmits a signal which restores electrical power to the specified PD 518. Following a "Sleep Delay" in block 644 which allows time for the PD 518 to resume normal operation, "AutoPing" in block 646 increments the "Fail Counter." In decision block 652 AutoPing assesses whether the "Fail Counter" exceeds five (5). If the "Fail Counter" exceeds five (5), then AutoPing proceeds to block 608. If the "Fail Counter" does not exceed 5, in block 654 "AutoPing" attempts to contact the PD 518 by sending a ICMP "ping" packet to the specified IP address.

In decision block 662 "AutoPing" assesses whether a reply to the "ping" packet was both timely and reports the proper packet size. If the reply was timely and reports the proper packet size, "AutoPing" in block 664 zeros the "Fail Counter," and in block 666 the programmed controller 34 sends information that the PD 518 has resumed operating via the RJ45 socket 26 as either a SNMP message, an E-mail, or a notification via the Short Message Service ("SMS"). After sending information that the PD 518 has resumed operating, "AutoPing" returns via block 618 to block 612.

If in decision block 662 "AutoPing" determines that the reply to the ICMP "ping" packet sent in block 654 was untimely or reported an improper packet size, "AutoPing" returns to block 632 to once again attempt restoring the PD 518 to operation by again by turning electrical power to the PD 518 first off and then on in blocks 632 through 646.

"System Log" Page

Figure 12:
FIG. 12 presents a Web browser's image of an "System Log" page transmitted from the internal Web server included in the PoE injector of FIG. 1 to a host computer's Web browser that reports a history of events that have occurred while the PoE injector operated.

The PoE injector 20 automatically keeps a log of system events including logins (successful and attempted), changes to settings, outlet switching, power interruptions, and AutoPing events. Recent events are stored in the log of the PoE injector 20 and accessible from the System Log page depicted in FIG. 12. Major events like logins, logouts, and changes to settings and power switching are logged automatically without any script. In addition to a log of events stored in the PoE injector 20, multiple PoE injectors 20 can independently export the occurrence of events to a single external syslog server.

Syslog is a standard for logging computer data. A syslog system includes at least two devices.

1. A device that generates messages, e.g. the PoE injector 20.

2. A server that receives and logs messages, reports receiving messages, and analyzes received messages.

The PoE injector 20 supports syslog to track and log events such as logins, outlet switching, power consumption, etc. To activate the PoE injector 20 for transmitting events to a syslog server, an administrator enters an IP address in the "Syslog Server" field of the internal Web server's "Setup" page depicted in FIG. 8. Any number of PoE injectors 20 may report to a single syslog server.

Syslog can be used in combination with scripting. For example, an administrator may want to periodically report a particular type of event occurring within the PoE injector 20. After entering an IP address for the syslog server on the "Setup" page, an administrator need compose only a simple script to periodically send the occurrence of such events to the syslog server. As is readily apparent to those skilled in the art, one or more scripts can be written to send messages about virtually anything occurring in the PoE injector 20 to the specified syslog server.

Free syslog server software is available for various different operating systems such as Windows, Linux and Solaris. An administrator can quickly identify such syslog server software using any conventional Internet search engine such as Google or Bing.

"Logout" Link

Selecting the "Logout" link on any Web page transmitted to the host computer's browser from the internal Web server of the PoE injector 20 restores the log-in message on the host computer's Web browser.

Although the present invention has been described in terms of the presently preferred embodiment, it is to be understood that such disclosure is purely illustrative and is not to be interpreted as limiting. Consequently, without departing from the spirit and scope of the disclosure, various alterations, modifications, and/or alternative applications of the disclosure will, no doubt, be suggested to those skilled in the art after having read the preceding disclosure.

Although the present invention has been described in terms of the presently preferred embodiment, it is to be understood that such disclosure is purely illustrative and is not to be interpreted as limiting. Consequently, without departing from the spirit and scope of the disclosure, various alterations, modifications, and/or alternative applications of the disclosure will, no doubt, be suggested to those skilled in the art after having read the preceding disclosure. Accordingly, it is intended that the following claims be interpreted as encompassing all alterations, modifications, or alternative applications as fall within the true spirit and scope of the disclosure.

What is claimed is:

1. A midspan power over Ethernet ("PoE") injector (20) or supplying electrical power to at least one powered device ("PD") (518) that is:
   a. located remotely from the POE injector (20); and
   b. connectable to the POE injector (20) by a first LAN cable (514) having:
      i. a remote end that is connectable to the PD (518); and
      ii. a midspan end (516) that is connectable to the POE injector (20),
      the first LAN cable (514) including:
      i. receiving conductors via which the PD (518) receives data;
      ii. transmitting conductors via which the PD (518) transmits data; and iii. at least a pair of insulated electrical conductors via which the PD (518) receives electrica power from the POE injector (20), the POE injector (20) comprising:
  a. at least one (1) pair of sockets (24),
    i. a first of the sockets (24) of the pair being a powered socket (24) for receiving the midspan end (516) of the first LAN cable (514); and
    ii. a second of the sockets (24) of the pair being an unpowered socket (24) for receiving a midspan end of a second LAN cable, the second LAN cable carrying only data received by and transmitted from the PD (518),
    the POE injector (20) including a data-signal bus (188) interconnecting the unpowered socket (24) and the powered socket (24) for coupling data signals therebetween;
  b. a power switch (156) that:
    i. is connected to the powered socket (24); and
    ii. when closed supplies electrical power to the powered socket (24) to be coupled therefrom via the midspan end (516) of a first LAN cable (514) that is mated with powered socket (24) to the pair of insulated electrical conductors of the first LAN cable (514); and
  c. a controller (34) that without negotiating with a PD (518) connected to the powered socket (24) by a first LAN cable (514):
    i. transmits a signal which effects closing of the power switch (156) thereby transmitting electrical power to the connected PD (518) via:
      1. the powered socket (24); and
      2. a first LAN cable (514) connected thereto; and
    ii. concurrently monitors operational status both:
      1. of a PD (518) connected to the powered socket (24) by a first LAN cable (514); and
      2. internal conditions within the POE injector (20).

2. The POE injector (20) of claim 1 wherein the POE injector (20) determines operational status of a PD (518) connected by a first LAN cable (514) to the POE injector (20) by sending a series of interrogations addressed to the PD (518) and analyzing replies received from the PD (518) in response thereto.

3. The POE injector (20) of claim 2 wherein when analysis of replies received from the connected PD (518) by the POE injector (20) establishes that the PD (518) is not operating, the controller (34):
  a. first terminates the signal transmitted to the power switch (156) which effects closing of the power switch (156) and transmission of electrical power to the connected PD (518); and
  b. then after an interval of time again transmits a signal which effects closing of the power switch (156) thereby resuming transmission of electrical power to the connected PD (518).

4. The POE injector (20) of claim 2 wherein when analysis of replies received from the connected PD (518) determines that the PD (518) is not operating, the controller (34) sends a message to a specified SYSLOG server.

5. The POE injector (20) of claim 1 wherein the POE injector (20) includes a fast-response semiconductor voltage-limiting device (166) connected to the power switch (156) for limiting voltage present across a pair of insulated electrical conductors included in a first LAN cable (514).

6. The POE injector (20) of claim 5 wherein the fast-response semiconductor voltage-limiting device (166) is a transient voltage protection diode, a/k/a transorb or tranzorb.

7. The POE injector (20) of claim 1 wherein the POE injector (20) includes a gas discharge tube (142) connected to the power switch (156) for limiting voltage present across a pair of insulated electrical conductors included in a first LAN cable (514).

8. The POE injector (20) of claim 1 wherein the POE injector (20) includes a polymeric positive temperature coefficient device (164) connected to the power switch (156) for limiting voltage present across a pair of insulated electrical conductors included in a first LAN cable (514).

9. The POE injector (20) of claim 1 wherein while the power switch (156) is transmitting electrical power to the powered socket (24) the POE injector (20) monitors electrical power at the powered socket (24) to assess whether voltage across the pair of insulated electrical conductors of the first LAN cable (514) indicates the presence of a short circuit.

10. The POE injector (20) of claim 9 wherein when the POE injector (20) detects a short circuit an audible alarm sounds.

11. The POE injector (20) of claim 1 wherein the power switch (156) is a relay.

12. The POE injector (20) of claim 11 wherein the relay is a double-pole, double-throw relay.

13. The POE injector (20) of claim 12 wherein, when the relay power switch (156) is open and not supplying electrical power to the powered socket (24), the power switch (156) connects together via the powered socket (24) a pair of insulated electrical conductors of a first LAN cable (514) the midspan end (516) of which is mated with the powered socket (24) and via which first LAN cable (514) a PD (518) receives electrical power from the POE injector (20).

14. The POE injector (20) of claim 1 further comprising an isolated, voltage regulated and current limited AC-DC switching power supply (82) for:
  a. energizing operation of the POE injector (20); and
  b. supplying electrical power to the power switch (156) that the power switch (156) supplies to the powered socket (24).

15. The POE injector (20) of claim 14 wherein the POE injector (20):
  c. further comprises a pair of terminals (88) for connecting to the POE injector (20) a battery (84) that is not included in POE injector (20); and
  d. includes a power source configuration circuit (98) which automatically ensures that electrical power from the battery (84) energizes operation of the POE injector (20) when the AC-DC switching power supply (82) fails to supply electrical power for energizing operation of the POE injector (20).

16. The POE injector (20) of claim 15 wherein the POE injector (20) further comprises a trickle charging output (316) for supplying a battery recharging current drawn from the AC-DC switching power supply (82) to a battery (84) connected to the pair of terminals (88).

17. The POE injector (20) of claim 1 further comprising a reset circuit (226) for transmitting a reset signal to the data-signal bus (188) for transmission to a PD (518) via the powered socket (24) and a first LAN cable (514) whose midspan end (516) is mated with the powered socket (24).

18. The POE injector (20) of claim 1 wherein:
  a. the POE injector (20) includes:
    i. more than one (1) unpowered socket (24) and powered socket (24) pairs, each unpowered socket (24) and powered socket (24) pair being respectively interconnected by a data-signal bus (188); and ii. a number of power switches (156) equal in number to that of unpowered socket (24) and powered socket (24) pairs, each power switch (156) being respectively:
   1. connected to the powered socket (24) of one (1) unpowered socket (24) and powered socket (24) pair; and
   2. when closed supplying electrical power to the powered socket (24) thereof;
b. the POE injector (20) stores a script that specifies a sequence in which electrical power is to be initially supplied successively to individual powered sockets (24); and
c. the controller (34) when initially commencing operation in accordance with the script successively transmits signals to the respective power switches (156) that effects the closing thereof thereby supplying electrical power successively to powered sockets (24) in the sequence specified by the script.

19. The POE injector (20) of claim 18 further comprising an isolated, voltage regulated and current limited AC-DC switching power supply (82) for:
   a. energizing operation of the POE injector (20); and
   b. supplying electrical power to all power switches (156) that supply electrical power to powered sockets (24).

20. The POE injector (20) of claim 19 wherein the POE injector (20):
   c. further comprises a pair of terminals (88) for connecting to the POE injector (20) a battery (84) that is not included in POE injector (20); and
   d. includes a power source configuration circuit (98) which automatically ensures that electrical power from the battery (84) energizes operation of the POE injector (20) when the AC-DC switching power supply (82) fails to supply electrical power for energizing operation of the POE injector (20).

21. The POE injector (20) of claim 18 further comprising at least one electrical surge suppression device (142, 332, 382, 384) that is shared among all power switches (156) that supply electrical power to powered sockets (24).

22. The POE injector (20) of claim 1 wherein:
a. the POE injector (20) includes:
   i. more than one (1) unpowered socket (24) and powered socket (24) pairs, each unpowered socket (24) and powered socket (24) pair being respectively interconnected by a data-signal bus (188); and
   ii. a number of power switches (156) equal in number to that of unpowered socket (24) and powered socket (24) pairs, each power switch (156) being respectively:
      1. connected to the powered socket (24) of one (1) unpowered socket (24) and powered socket (24) pair; and
      2. when closed supplying electrical power to the powered socket (24) thereof; and
b. the POE injector (20) determines operational status of at least one (1) PD (518) connected by a first LAN cable (514) to the POE injector (20) by sending a series interrogations addressed to the PD (518) and analyzing replies received from the PD (518) in response thereto.

23. The POE injector (20) of claim 22 wherein:
a. the POE injector (20) stores a script that specifies a sequence in which electrical power is to be initially supplied successively to individual powered sockets (24); and
b. when analysis of replies received from the connected PD (518) to which interrogations are addressed the POE injector (20) determines that the PD (518) is not operating, the controller (34):
   i. in accordance with the script first terminates signals transmitted to those power switches (156) specified by the script which effect closing of the specified power switches (156) and transmission of electrical power to connected PDs (518); and
   ii. then in accordance with the script successively transmits signals to the respective power switches (156) specified by the script that effect the closing thereof thereby supplying electrical power successively to powered sockets (24) in the sequence specified by the script.

* * * * *